United States Patent [19]

Castro

[11] Patent Number: 5,774,535
[45] Date of Patent: *Jun. 30, 1998

[54] TELECOMMUNICATION-TIME METERING DEVICE UTILIZABLE FOR PREPAYMENT OF INFORMATION TRANSFERS BETWEEN INFORMATION TRANSFERRING DEVICES WITHIN A TELECOMMUNICATION NETWORK

[75] Inventor: Peter D. Castro, New York, N.Y.

[73] Assignee: International Integrated Communication, Ltd., New York, N.Y.

[*] Notice: The term of this patent shall not extend beyond the expiration date of Pat. No. 5,440,621.

[21] Appl. No.: 511,036

[22] Filed: Aug. 3, 1995

Related U.S. Application Data

[63] Continuation of Ser. No. 155,732, Nov. 22, 1993, Pat. No. 5,440,621, which is a continuation of Ser. No. 738,577, Jul. 31, 1991, Pat. No. 5,265,155.

[51] Int. Cl.⁶ .......................... H04M 15/18; H04M 17/02
[52] U.S. Cl. .......................... 379/144; 379/114; 379/121; 379/130
[58] Field of Search .................................... 379/114, 115, 379/121, 124, 125, 126, 130, 131, 143, 144, 155, 377, 91, 93; 235/380, 381; 340/825.34, 825.35

[56] References Cited

U.S. PATENT DOCUMENTS

| Re. 32,263 | 10/1986 | Kaminsky . |
|---|---|---|
| 3,255,439 | 6/1966 | Simjian . |
| 3,428,948 | 2/1969 | Simjian . |
| 3,501,744 | 3/1970 | Simjian . |
| 3,769,463 | 10/1973 | Graham et al. . |
| 4,139,739 | 2/1979 | Von Meister . |
| 4,160,129 | 7/1979 | Peyser et al. . |
| 4,199,659 | 4/1980 | Lischin . |
| 4,404,433 | 9/1983 | Wheeler et al. . |
| 4,518,824 | 5/1985 | Mondardini . |
| 4,525,601 | 6/1985 | Barnich et al. . |
| 4,614,861 | 9/1986 | Pavlov et al. . |
| 4,706,275 | 11/1987 | Kamil ...................................... 379/144 |
| 4,717,815 | 1/1988 | Tomer . |
| 4,759,056 | 7/1988 | Akiyama . |
| 4,776,000 | 10/1988 | Parienti ............................... 379/144 X |
| 4,860,346 | 8/1989 | Mellon . |
| 4,866,760 | 9/1989 | Kakizaki . |
| 4,897,870 | 1/1990 | Golden . |
| 5,109,401 | 4/1992 | Hattori et al. ....................... 379/131 X |
| 5,113,433 | 5/1992 | Hird et al. ............................... 379/130 |
| 5,266,782 | 11/1993 | Alanara et al. ..................... 379/144 X |
| 5,359,182 | 10/1994 | Schilling ................................. 379/144 |
| 5,440,621 | 8/1995 | Castro .................................... 379/114 |

*Primary Examiner*—Curtis Kuntz
*Assistant Examiner*—Paul Looris
*Attorney, Agent, or Firm*—Hopgood, Calimead Kalil & JudLowe

[57] ABSTRACT

The present invention provides a method and apparatus for prepayment of telecommunication connections between first and second telecommunication devices operably associatable with the telecommunication lines of a telecommunication switching network. In general, the method involves storing telecommunication-time data representative of a prepurchased amount of telecommunication-time available for payment of telecommunication connections in the telecommunication switching network. At the initiation of the first telecommunication device, a telecommunication connection is established between the first and second telecommunication devices so that a telecommunication process can be conducted therebetween. The telecommunication connection between the first and second telecommunication devices is terminated in response to termination of the telecommunication process. The time duration of the telecommunication connection is measured. The stored telecommunication-time data is processed to indicate a decrement in the available telecommunication-time, which is essentially equal to the measured time duration of the telecommunication connection. Various embodiments of telecommunication-time metering apparatus are provided for carrying out the method of the present invention.

7 Claims, 16 Drawing Sheets

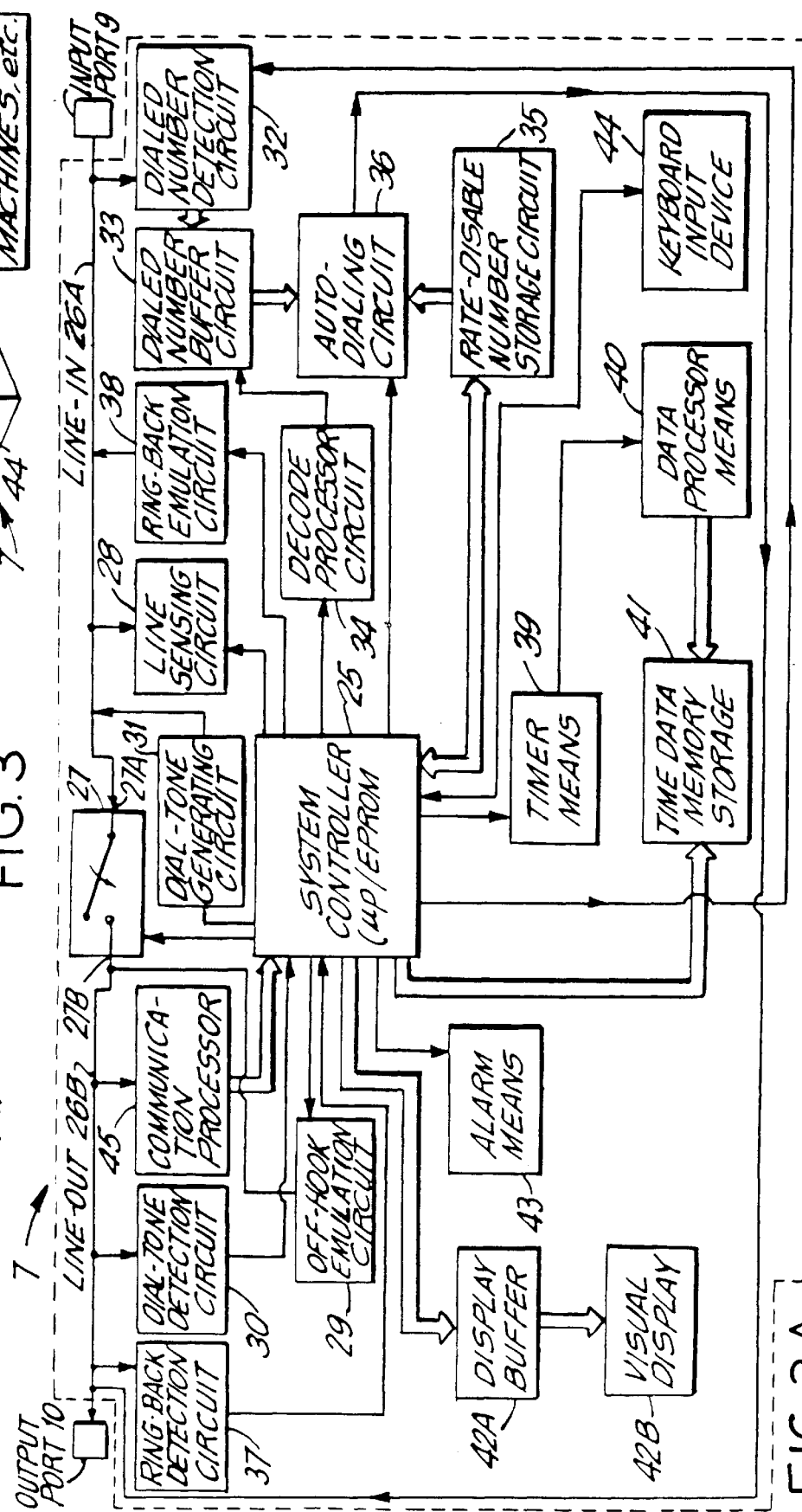

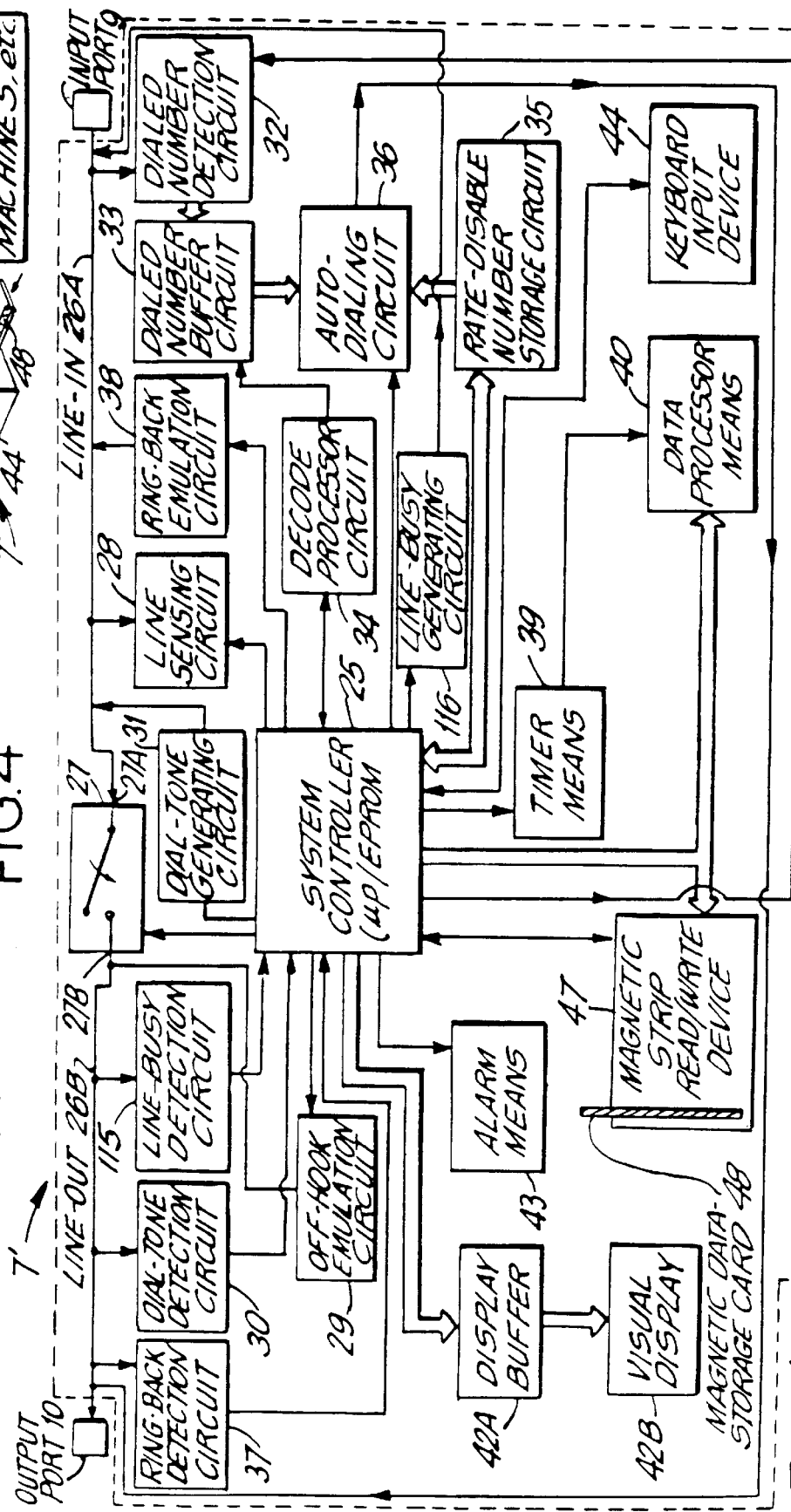

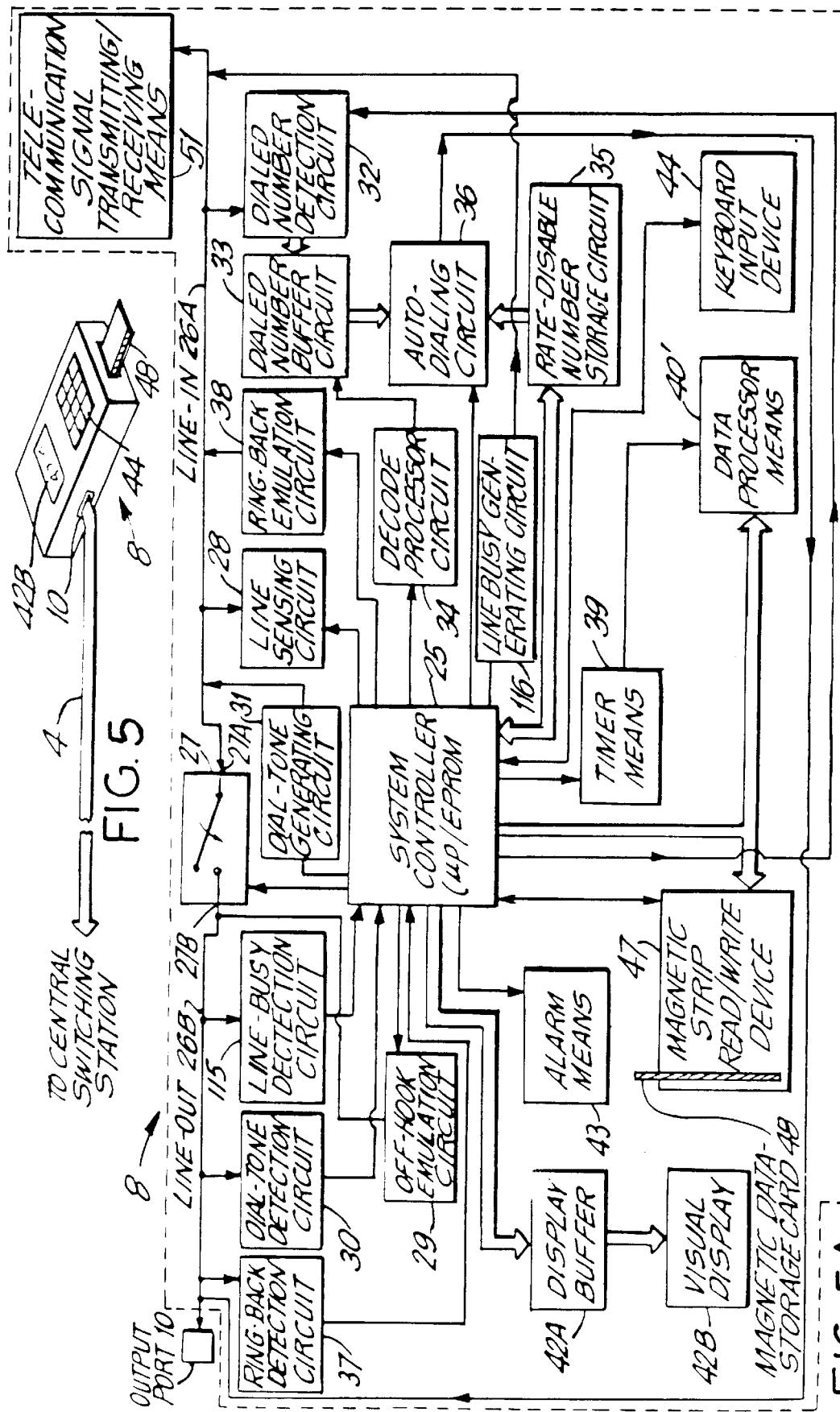

5,774,535

TELECOMMUNICATION-TIME METERING DEVICE UTILIZABLE FOR PREPAYMENT OF INFORMATION TRANSFERS BETWEEN INFORMATION TRANSFERRING DEVICES WITHIN A TELECOMMUNICATION NETWORK

This application is a continuation of Ser. No. 08/155,732, filed Nov. 22, 1993, now U.S. Pat. No. 5,442,121, which is a continuation of Ser. No. 07/238,577, filed Jul. 31, 1991, now U.S. Pat. No. 5,265,155.

BACKGROUND OF THE INVENTION

1. Field of the Invention

The present invention generally relates to methods and apparatus for prepayment of telecommunication connections in a telecommunication switching network, and more particularly to such methods and apparatus utilizing stored data representative of prepurchased telecommunication-time.

2. Brief Description of the Prior Art

Prepayment of telephone calls is generally well known in the art. For example, a variety of prepayment telephone systems are disclosed in U.S. Pat. No. 4,706,275 to Kamil; U.S. Pat. No. 4,879,744 to Tasaki, et al.; and U.S. Pat. No. 4,975,942 to Zebryk.

U.S. Pat. No. 4,706,275 to Kamil discloses a telephone system which requires a special exchange for storing data representative of a prepurchased monetary value deposited to the credit of the calling party. This special exchange permits access to the central switching station by the calling party transmitting to the special exchange, a special code and the number of the called party. If the special code is valid and the initial prepayment amount is sufficient at the time of calling, then the calling party is connected to the called party. During the connection, the running cost of the call is monitored (i.e. computed). When either party hangs up, or the running cost of the call exceeds the current initial prepayment amount, whichever occurs first, the calling party is disconnected. Thereafter, the computed running cost of the call is deducted from the initial prepayment amount.

U.S. Pat. No. 4,879,744 to Tasaki, et al. discloses a card-operated telephone system which is adapted for installation in a telecommunication switching network. The card-operated telephone includes a magnetic strip reader/writer which reads data from a magnetic telephone card, and writes necessary data into the telephone card. This stored data represents the balance of a prepurchased monetary value, and card issue number. Each time the telephone card is used, billing information is computed at the central telephone office, transmitted to the telephone system and used to diminish the balance of the prepurchased monetary value by the computed cost of each call. Also, the first time the card is used, the telephone system records the dialed number of the telephone card and automatically dials the recorded number each time the card is subsequently used.

U.S. Pat. No. 4,975,942 to Zebryk discloses a credit/calling card pay telephone system. The system includes a local telephone unit having a telephone instrument and a self-contained database. The self-contained database is provided for checking the validity of an entered calling card or credit card number. Upon entering the number to be dialed and the calling or credit card number, and after its validity is checked in the database, this information is stored and the call is processed by out-dialing on a standard subscriber telephone line. During the call, the line is monitored until terminated and the transaction record is stored in non-volatile memory. After a programmable number of calls, a period of time or combination thereof, the local unit automatically dials a local host computer with its own internal modem. Upon connection, the local telephone unit transmits its transaction records in batches to the host computer, which subsequently generates billing information with calculated charges.

While such prior art systems facilitate prepayment of phone calls, they nevertheless suffer from significant shortcomings and drawbacks.

In particular, prior art prepayment systems generally require an extensive infrastructure which is both expensive and difficult to implement in practice. Also, the cost of operating such prior art prepayment systems is generally high due to data communication required for call confirmation, charge computations, and billing procedures. In addition, as such prior art prepayment systems require for each placed call, the computation of call cost for each unit of time, this adds to the complexity of such systems, especially when call rates are dependent upon time of calling and place of origination of the call.

Thus, there is a great need in the art for a method and apparatus that permits prepayment of telecommunication connections without the shortcomings and drawbacks of the prior art.

Accordingly, it is a primary object of the present invention to provide a method and apparatus for prepayment of telecommunication connections, wherein telecommunication-time is treated as a commodity which can be purchased or traded, for example, when market conditions are favorable, and used as desired to procure prepaid telecommunication connections within a telecommunication switching network.

It is another object of the present invention to provide such a method and apparatus, in which the prepayment of telecommunication connections with prepurchased telecommunication-time eliminates the need for rate schedules and the computation of call costs and charges.

It is a further object of the present invention to provide a method and apparatus for prepayment of telecommunication connections, wherein telecommunication-time is prepurchased, stored in the form of telecommunication-time data in a central storage device in communication with a central switching system, and decremented during a procured telecommunication connection, while disabling rate schedules from use in the cost accounting of the procured telecommunication connection.

It is a further object of the present invention to provide a method and apparatus for prepayment of telecommunication connections, wherein telecomunication-time is prepurchased, stored in the form of telecommunication-time data within a remote telecommunication-time metering device that is insertable along a telecommunication line connecting an associated telecommunication device, such as a telephone set or facsimile machine, and a telecommunication switching station.

It is a further object of the present invention to provide a method and apparatus for prepayment of telecommunication connections, wherein telecommunication-time is prepurchased, stored in the form of telecommunication-time data within a remote telecommunication device, such as a telephone instrument or a facsimile machine, that is operably associated with a telecommunication line of a telecommunication switching network.

An even further object of the present invention is to provide such apparatus in the form of a telecommunication-time metering device or time-metered telecommunication device which is capable of reading prepurchased telecommunication-time data from a magnetic-strip card, and processing such data to reflect a decrease in telecommunication-time which is essentially equal to the time duration lapsed during each telecommunication connection within the associated telecommunication switching network.

These and other objects of the present invention will become apparent hereinafter.

SUMMARY OF INVENTION

The present invention provides a method and apparatus for prepayment of telecommunication connections between at least first and second telecommunication devices, each operably associatable with the telecommunication lines of a telecommunication switching network.

In general, the method involves storing telecommunication-time data representative of a prepurchased amount of telecommunication-time available for prepayment of telecommunication connections within the switching network. At the initiation of the first telecommunication device, a telecommunication connection is established between the first and second telecommunication devices so that a telecommunication connection can be conducted therebetween. The time duration of the telecommunication connection is measured. The telecommunication connection between the first and second telecommunication devices is terminated in response to termination of the telecommunication connection. In response to the termination of the telecommunication connection, the measurement of the time duration of the telecommunication connection is ceased. The stored telecommunication-time data is processed to indicate a decrement in telecommunication-time, which is essentially equal to the measured time duration of the telecommunication connection.

Telecommunication-time metering apparatus of the present invention may be embodied in an infinitely wide number of system and/or devices while carrying out the general principles of the method hereof.

According to a first aspect of the present invention, the telecommunication-time metering apparatus is realized in the form of a portable hand-holdable device which is adapted for installation along a telecommunication line of a switching network, to which a telecommunication device is operably connected. The device stores prepurchased telecommunication-time data and transmits a rate-disable signal to the central switching station. The rate-disable signal, representative of a prepayment service request, in effect disables the application of rates to the transaction record produced in connection with the corresponding telecommunication connection(s) effected across the network. During the telecommunication connection, the telecommunication-time data stored in the device is modified so as to reflect a decrement in available telecommunication-time, which is essentially equal to the duration of the telecommunication connection.

In another embodiment of this aspect of the present invention, such telecommunication-time metering apparatus is embodied within a telecommunication device, such as a facsimile-machine or telephonic communication device. In this way, such devices are capable of effecting prepayment of telecommunication connections across the network. Alternatively, telecommunication-time metering apparatus is embodied within a telecommunication system having, for example, a private exchange wherein each telecommunication line in the system has access to a local reserve of prepurchased telecommunication-time.

According to a second aspect of the present invention, the telecommunication-time metering apparatus is realized in the form of a central switching station and associated billing system, that permits prepayment of telecommunication connections using conventional telecommunication devices operably connected within the network. According to this aspect of the invention, the associated billing system stores data representative of prepurchased telecommunication-time available to prepaid subscriber lines which are preregistered in a directory. When a telecommunication connection (s) is initiated within the network by a telecommunication device operably connectable to a prepaid subscriber line, transaction record data is produced in connection with the telecommunication process conducted across the telecommunication connections(). This transaction record data is subsequently utilized to process corresponding prepurchased telecommunication-time data, so as to reflect a decrement in available prepurchased telecommunication-time.

As a result of the present invention, a number of significant advantages are provided. For example, any group of subscriber lines can be registered with a remote time metering device of the present invention so that each subscriber line has access to a local reserve of prepurchased telecommunication-time. Alternatively, any group of subscriber lines or assigned subscriber numbers can be registered with one or more associated billing systems so that each such subscriber line or number has access to a central reserve of prepurchased telecommunication-time. In one such embodiment, the central reserve of prepurchased telecommunication time can be available to each subscriber line or number registered as a member in a prepaid group. Yet in another embodiment, the central reserve of prepurchased telecommunication time can be available to a party who is to be called by non-subscribing parties, using for example, an "800" number. In this way, the sponsor of prepaid telecommunication lines can prepay for incoming calls on such lines.

Preferably telecommunication-time according to the present invention is purchased under favorable economic conditions and used as needed, resulting in substantial savings to consumers and benefit to telecommunications carriers alike.

BRIEF DESCRIPTION OF THE DRAWINGS

For a further understanding of the objects of the present invention, the Detailed Description of the Illustrated Embodiments is to be described in connection with the following drawings, in which:

FIG. 3 is a perspective view of a first embodiment of the present invention in the form of telecommunication-time metering device which is adapted for insertion along a telecommunication line between a telecommunication device and a central switching station;

FIG. 3A is a block functional diagram of the portable telecommunication-time metering device of FIG. 3, in which telecommunication-time data is stored in a non-volatile memory storage unit;

FIG. 4 is a second embodiment of the present invention in the form of the portable telecommunication-time metering device which is capable of reading telecommunication-time data from magnetic-strip data storage cards;

FIG. 4A is a block functional diagram of the telecommunication-time metering device illustrated in FIG. 4;

FIG. 5 is a third embodiment of the present invention in the form of a telecommunication device, such as a telephone instrument or facsimile machine, which is capable of reading telecommunication-time data from magnetic-strip data storage cards;

FIG. 5A is a block functional diagram of the telecommunication device illustrated in FIG. 5;

DETAILED DESCRIPTION OF THE ILLUSTRATED EMBODIMENTS

Referring to FIGS. 1 through 8B, the method and apparatus for prepayment of telecommunication connections according to the first aspect of the invention, will be described.

Figure 1:
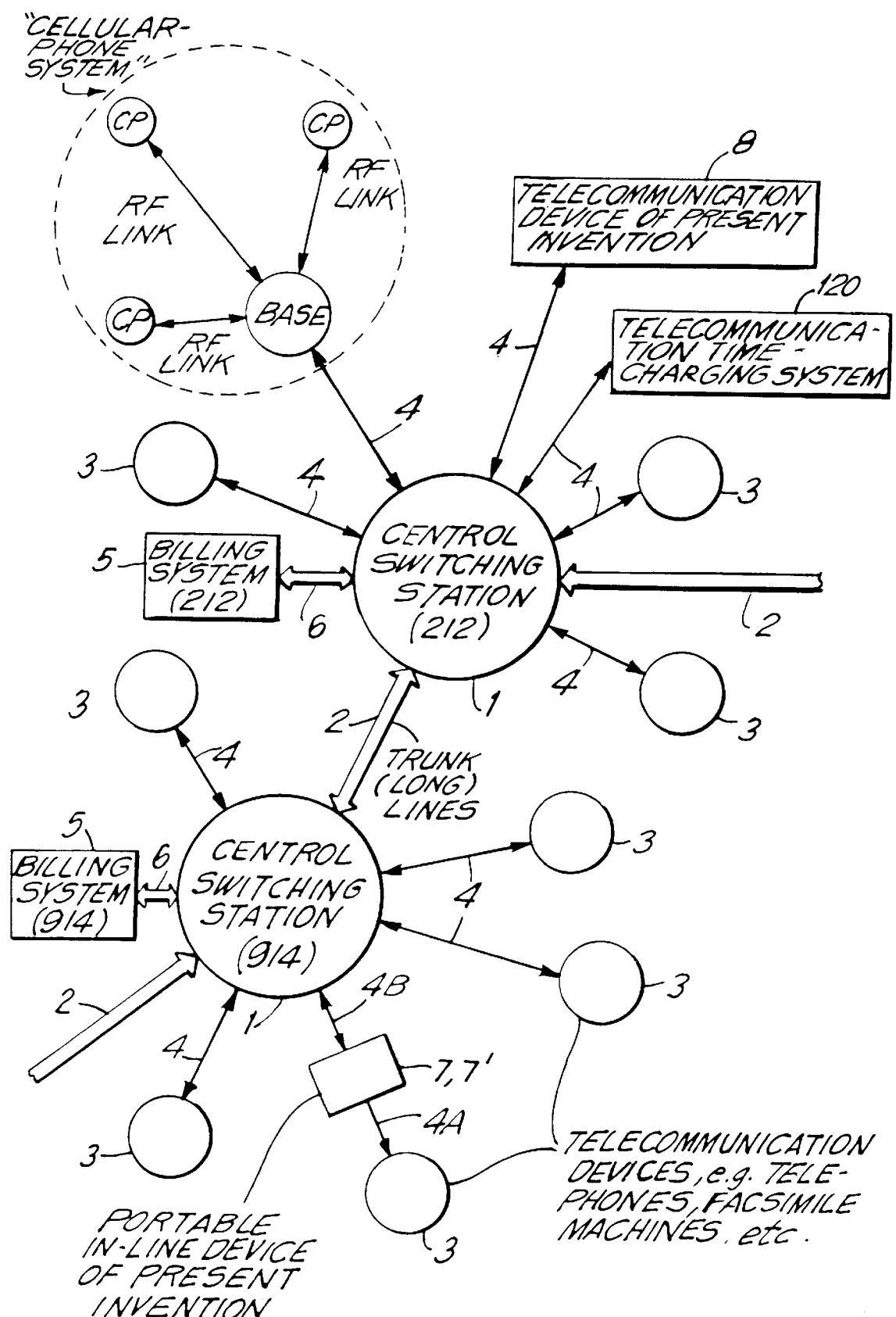
FIG. 1 a schematic representation of a telecommunication switching network according to the first aspect of the present invention, showing a plurality of central switching stations in communication with each other by way of trunk-line circuits, billing systems in operable association with respective central switching stations, a plurality of conventional telecommunication devices each connected to a central switching station by way of an assigned telecommunication line, and a portable telecommunication-time metering device and time-metered telecommunication device of the present invention installed within the switching network.

In FIG. 1, a portion of a public telecommunication switching network (PTSN) according to the first aspect of the present invention is schematically represented. For purposes of illustration and to avoid obfuscation of the present invention, only the central switching stations and associated billing systems for two area codes, i.e. 914 and 212, are shown. As illustrated, central switching station 1 for area code 914 is in communication with central switching station 1 for area code 212 by way of trunk-line circuit 2, well known in the art. Each central switching station is connected to subscriber telecommunication devices 3 by way of a respective telecommunication line 4 that has been assigned a unique calling number by its central switching station. Notably, as telephones, facsimile machines and other data-communication devices can be connected within the telecommunication switching network, the term "telecommunication device" shall be deemed to include all such devices. Likewise, the term "telecommunication process" shall be deemed to include all data-communication processes conducted between two or more telecommunication devices within the telecommunication switching network. In addition, term "telecommunication line" as used hereinafter shall include hard-wire lines, such as copper pairs, as well as any medium or channel permitting transmission of microwave, radio, acoustic and/or optical signals.

In order to compute the cost (i.e., charge) for each telecommunication process conducted through a telecommunication connection across the switching network and account for these charges over time for subscriber billing purposes, a billing system 5 is operably connected to each central switching station by way of line 6. Typically, for both local (i.e. within calling area-code) and long-distance (i.e. outside calling area-code) calls, the billing system associated with the central switching station of the "calling" telecommunication device (i.e. line) is capable of computing and accounting for call costs. Utility fees owing to other central switching stations for use of their lines and equipment during long-distance calls, can be accounted for and paid in a conventional manner well known in the art.

Within the above-described telecommunication switching network of FIG. 1, either telecommunication-time metering device 7 or time-metered telecommunication device 8 of the present invention can be utilized. In either case, however, central switching station 3 (e.g. central office) is capable of receiving signals generated from or through these devices in order to carry out the method of the first aspect of the present invention. Before describing the details of this aspect of the telecommunication switching network, it is best to first describe briefly the general structure and function of telecommunication-time metering apparatus in accordance with the present invention. This can be achieved by referring to FIGS. 3 and 3A which illustrate a first embodiment of telecommunication-time metering apparatus according to the present invention. It is noted, however, that other illustrated embodiments of the first aspect of the present invention can be used for such exposition purposes.

As illustrated in FIG. 3, such apparatus is in the form of a portable telecommunication-time metering device 7. As shown, this device is insertable along a conventional telecommunication line interconnecting the central switching station and a conventional telecommunication device, such as a telephone instrument or facsimile machine. In order to effect such in-line installation, telecommunication-time metering device 7 includes an input plug 9 and an output jack 10, which are, for example, of the RS-11 type. Details aside, between input plug 9 and output jack 10, telecommunication-time metering device 7 is provided with several basic functions for carrying out the method of the first aspect of the present invention. These basic functions will now be described in sequence below.

Telecommunication-time metering device 7 is capable of permitting dialing and like signals, originating from an associated telecommunication device, to be transmitted to the central switching station. Telecommunication-time metering device 7 is capable of storing telecommunication-time data representative of prepurchased telecommunication time available to the user of the device.

Telecommunication-time metering device 7 is also capable of detecting when a dialing signal from the "calling party" (i.e. first telecommunication device) is either about to be or has been transmitted. Thereafter, telecommunication-time metering device 7 generates a digital code (e.g. rate-disabling signal) requesting prepayment service, which is transmitted to the central switching station. At the central switching station, the dialed number and rate-disabling code are received, buffered and decoded, and the ringing signal is generated and transmitted to the "called party" (i.e. second telecommunication device). For a local call, the central switching station of the first telecommunication device is the same as the second telecommunication device and thus the ringing and ring-back signals are generated by the same central switching station. However, for long-distance calls, the central switching station of the second telecommunication device generates the ringing signal to the called party, while the first communication device generates the ring-back signal to the calling party. If the second telecommunication device goes "off hook", then all central switching stations connecting the first and second telecommunication devices will effect a "telecommunication connection" across the central switching station(s), and thus between these telecommunication devices.

In response to establishing this telecommunication connection, a signal (e.g. rate-disable data) is preferably generated at the central switching station of the first telecommunication device. Preferably, this rate-disable data is buffered for subsequent transmission to the billing system, along with transaction record data produced in connection with the effectuated telecommunication connection (i.e. process). Upon establishing the telecommunication connection, the ringing and ring-back signals produced by the central switching station will cease, and this, preferably, would be the time instant when the calling party (i.e. first telecommunication device) should be obligated to begin paying for the privilege to conduct a telecommunication process across the telecommunication connections. Consequently, according to the first aspect of the present invention, the telecommunication-time motoring device is capable of measuring the time duration of the telecommunication connection maintained across the central switching station(s). Notably, this time measuring function will continue up until the time the telecommunication connection is disconnected for whatever reason.

Telecommunication-time metering device 7 is also capable of modifying (e.g. processing) the telecommunication-time data stored in the telecommunication-time metering device so as to reflect decrements in prepurchased telecommunication-time during the course of a telecommunication connection. Notably, as with all other functions, this function may be carried out in a number of ways, including for example, by use of a data processing device, a count-down timer circuit, etc.

Finally, telecommunication-time metering device 7 is capable of displaying the running balance of remaining prepurchased telecommunication-time available for future utilization, and the running balance of time utilized during an on-going telecommunication connection (i.e. processes). Preferably, the decrementing and display functions are each performed on a continual basis so that the user can observe, at any time during an on-going telecommunication process, the remaining amount of prepurchased telecommunication-time available in the time metering device.

While these basic functions have been described in connection with the telecommunication-time metering device of FIGS. 3 and 3A for purposes of illustration, these functions will also be found in telecommunication-time metering devices of FIGS. 4, 4A and 7, as well as in time-metered telecommunication devices of FIGS. 5 and 5A. The details of the above-mentioned devices will be described hereinafter. It is believed, however, that these various embodiments of the present invention are best understood in view of a description of the central switching station and billing system of the first aspect of the present invention.

Figure 2:
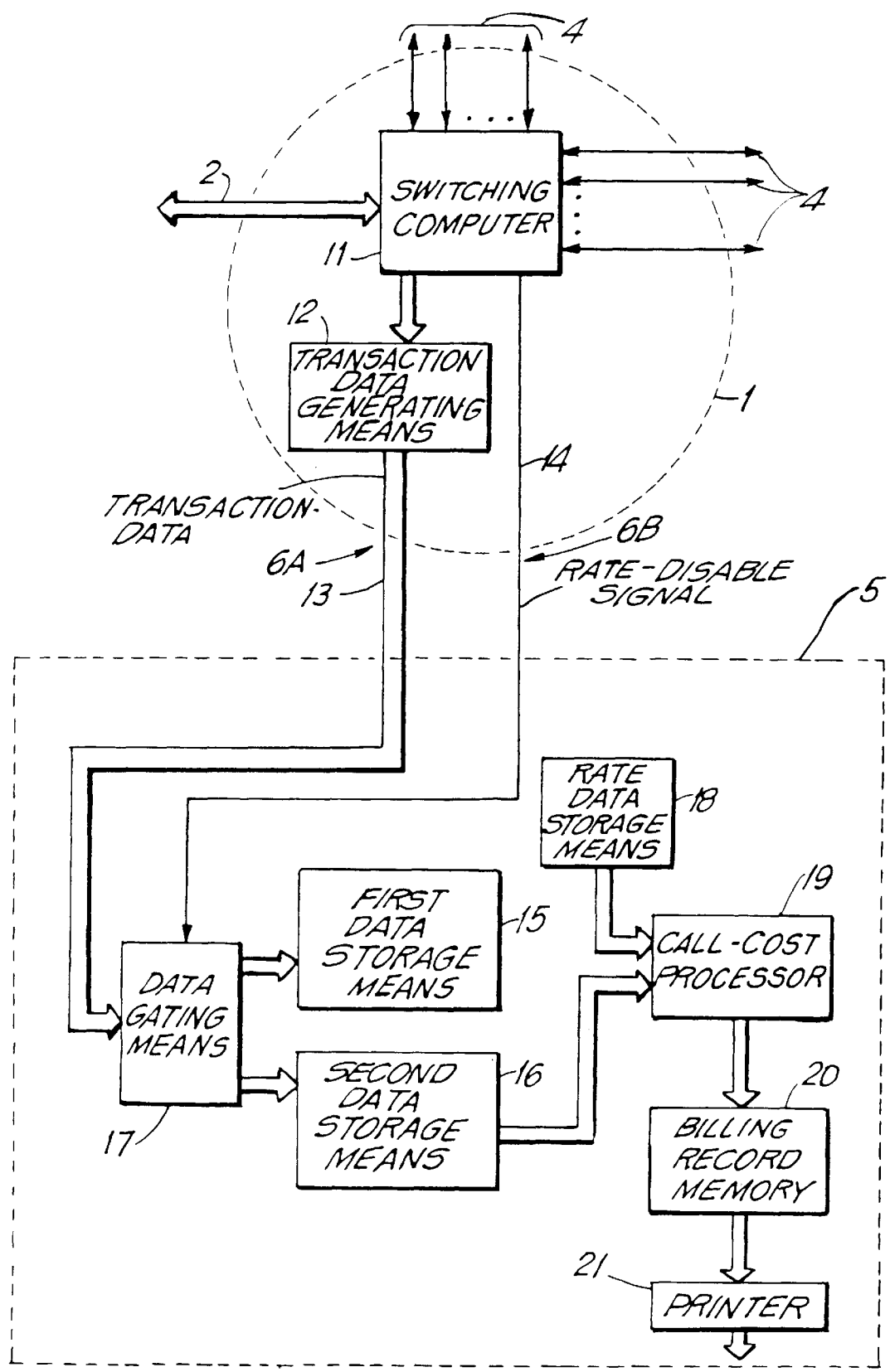
FIG. 2 is a block functional diagram of a central switching station and billing system of the present invention, which are configurable within the telecommunication switching network illustrated in FIG. 1.

As shown in FIG. 2, each central switching station (e.g. central office or remote housing) 1 of the greater telecommunication switching network comprises a telecommunication switching means 11, and transaction record data generating means 12. Preferably, telecommunication switching means 11 is realized in the form of a high-speed switching computer that is specially adapted to establish an interconnection between two or more telecommunication lines 4, designated by the numbers of the calling and called parties. Typically the switching computer is capable of establishing such telecommunication connections between any two or more telecommunication lines among potentially hundreds of thousands of local subscriber lines within, for example, a given area-code serviced by a central switching station. In addition to these interconnecting (i.e. switching) functions, switching computer 11 also includes a number of other capabilities. For example, switching computer 11 includes circuitry for measuring the time duration of each telecommunication connection made, accepting signalling information (i.e. on-hook, off-hook and dialing signals), and carrying out various telecommunication functions, including generation and transmission of dial-tone-signals, ringing signals, ring-back signals, line busy signals and the like, all of which are well known in the art. The switching computer typically is prepared to receive dialing information communicated by rotary and Touchtone® dialing techniques.

In addition, for calls placed outside the local area-code, trunk-line circuits 2 are operably associated with the switching computers in a conventional manner. Along such "trunks" between telephone buildings, similar on-hook, off-hook and dialing information (i.e. signals) must be exchanged. When metallic connections (i.e. pairs of copper wires contained in telephone calls) are replaced by electronic carrier systems, all of the functions described above must typically be implemented in a transparent fashion. That is, existing customer equipment and telephone office equipment must interconnect and operate with the carrier system as if it consisted of parallel wire pair paths. For a more detailed description of requirements typical in analog and digital telecommunications networks of the type being herein described, reference should be made to "Digital Transmission Building Blocks" by Stewart D. Personick, published in IEEE Communications Magazine, January 1980, Vol. 18, No. 1, at pages 27–36, and incorporated herein by reference.

In the illustrated embodiments, transaction record generating means 12 is realized as apparatus capable of generating transaction record data 13 including the line numbers of the calling and called parties, and the time, date and measured time duration of telecommunication connection.

While not shown, switching computer 11 also includes incoming-number buffering circuitry and decoding circuitry for decoding incoming number sequences using a variety of code detection processes. In the case of the first aspect of the present invention, such code detection processes include, for example, area-code detection, rate-disable (i.e. prepaid service request) detection and rate-reenable detection. Notably, the output of the rate-disable code detection process is rate-disable data 14 which, along with and transaction record data 13 produced at the termination of each call (i.e. telecommunication process) are provided to associated billing system 5. For purposes of illustration only, these two data items are schematically shown in FIG. 2 as being transmitted to billing system 5 by way of lines 6A and 6B, respectively.

As illustrated in FIG. 2, billing system 5 comprises first and second data storage means 15 and 16, data gating means 17, rate-data storage means 18, call cost processing means 19, billing record storage means 20 and billing record printing means 21. First and second data storage means 15 and 16 can be any memory device which stores transaction data records produced from central switching station 1 for each telecommunication connection effectuated (i.e. process conducted). While illustrated as separate units, first and second data storage means can be realized in a single data storage device, whose storage space is ramified into two distinct subspaces. Transaction-record data produced for each prepaid telecommunication connection is stored in first data storage means 15. This can be achieved by providing gating means 17 data 14 from the disable-rate code detection processor to direct data flow from transaction data generating means 12 into data storage means 15 as shown. Transaction-record data produced for each non-prepaid telecommunication connection, is stored in second data storage means 16 for subsequent cost computation. Both types of transaction record data can be organized in a variety of ways, for example, according to (i) the number of each telecommunication line allocated by the central switching station, or (ii) an assigned number to each prepaid subscriber.

To compute the cost for each call transaction, rate-data from rate-data storage means 18 and transaction record data from second data storage means 16 are both provided to cost processor 19, as shown. In general, cost processor 19 can be any suitably programmed device, such as a general purpose computing system with appropriate software for cost computation. Typically, rate-data is a function of the time, day and duration of the call, and thus such information from each transaction record will be used to select the applicable cost rate from rate-date storage means.

For each transaction record provided to the cost processor, a billing record is generated and stored in billing record storage means 20. Preferably, billing record data is organized according to numbers assigned to the telecommunication lines connected to the central switching station. In this way, a complete monthly billing record can be readily generated for each line number (i.e. prepaid subscriber), and printed out by printing means 21 for mailing to customers in a conventional fashion.

Having described the structure and function of the central switching station and billing system of FIGS. 1 and 2 and how it generally associates with the telecommunication-time metering apparatus hereof, the details of the various embodiments of the first aspect of the present invention will be described below.

As shown in FIGS. 3 and 3A, telecommunication-time metering device 7 comprises a number of components, all of which are under the control of system controller 25, preferably realized in the form of a microprocessor provided with EPROM as program memory for storage of the control program and the like. Also, while not shown to avoid obfuscation of the present invention, battery power circuitry and data and address buses are provided to all embodiments in a manner well known in the art.

Between input plus 9 and output jack (i.e. socket) 10, a telecommunication switch 26 is connected consequently, a section of telecommunication line designated line-in 26A, is disposed between input plug 9 and input port 27A of Switch 27, and a section of telecommunication line designated line-out 26B, is disposed between output jack 10 and output port 27B of Switch 27, as shown. Notably, telecommunication line 4, as well as line-in and line-out sections 26A, 26B, will consist of a number of independent conductors (e.g. tip and ring lines) for reception of dial-tone, ringing, ring-back, line-busy, and incoming message signals, as well as for transmission of dialing, rate-disable, and rate-reenable signals.

In order to sense whether the telecommunication device connected to input port 9 is in the "off-hook" condition and thus ready to transmit a dialing signal (i.e. called party number), line sensing circuit 28 is provided. Preferably, line-sensing circuit 28 detects the presence of the "off-hook" condition by simply sensing the input impedance of the telecommunication device connected to the input port. Since telecommunication switch 27 is in the open-circuit condition at the time of initially sensing for the off-hook condition, it is necessary emulate this off-hook condition on the line-out so that the central switching station will be elicited to generate a dialing-tone on the telecommunication line. This "off-hook" condition is emulated on the line-out side of the telecommunication switch by an off-hook emulation circuit 29 which emulates, for example, the impedance otherwise presented by a telecommunication device in the off-hook condition. As all other system components, off-hook emulation circuit 29 is controlled by the system controller When the central switching station senses the off-hook condition, it will generate a dial-tone on the telecommunication line. Again, since telecommunication switch 27 is in the open-circuit condition at the time of dial-tone generation, it is necessary to detect the dial-tone on the line-in side of switch 27 and to generate a corresponding dial tone signal on the line-in side of switch. This is achieved by providing a dial-tone detecting circuit 30 on line-out, and a dial-tone emulation (i.e. generating) circuit 31 on line-in 26A, as shown. Each of these circuits are under the control of the system controller.

After the dial-tone is detected by a telecommunication device (e.g. the telephone caller or facsimile machine), a dialed signal, representative of the dialed number (i.e. called), is transmitted through input port 9 and over line-in 26A. In order to detect the dialed number, a dialed number detection circuit 32 is provided. As illustrated in FIG. 3A, dialed number detection circuit 32 is connected to line-in 26A so as to sense the presence of dialing signals and detect the number sequence being dialed out. Detection circuit 32 then transfers the detected number sequence to dialed number buffer circuit 33 for temporary storage. Notably, after each instance of off-hook condition detection by line sensing circuit 28, the system controller causes the contents of dialed number buffer circuit 33 to be cleared, thus provide the required buffer space for storage of the dialed number sequence detected.

In order to determine whether a long-distance or local number is being dialed, a decode processor 34 is operatively associated with buffer circuit 33 to readily process the dialed number stored therein. In the event that only long-distance numbers (i.e. calls) are to receive prepayment treatment in accordance with the present invention, only then will the rate-disable number sequence, prestored in rate-disable number buffer circuit 35, be provided auto-dialing circuit 36. The manner in which a valid rate-disable number sequence is written into buffer circuit 35, will be described hereinafter in connection with meter time-charging. Preferably, the detected dialed number is written into a first set of serial digit locations in auto-dialing circuit 36, and the rate-disable number sequence is written into a second set of consecutive digit locations. In this way, the resulting composite number in the auto-dialing circuit 36 will closely resemble the number format presently utilized in conventional "calling-card" processes.

With telecommunication switch 27 closed, auto-dialing circuit 36 dials out (i.e. transmits) the composite number onto line-out 26B to the central switching station. The central switching station buffers the received composite number and decode processes it as described hereinabove. In the case of a long distance call, the central switching station of the called party (i.e. second telecommunication device) generates a ringing signal over the called party's line, while the central switching station of the calling party (i.e. first telecommunication device) generates a ring-back signal over the calling party's line. In order that the first telecommunication device (i.e. calling party) can detect the ring-back signal on line-in while telecommunication switch 27 is open, a ring-back signal detection circuit 37 is operably connected to line-out to detect ring-back signal. In addition, ring-back signal emulation circuit 38 is operably connected to line-in to generate an emulation of the ring-back signal on line-in, in response to detection of the ring-back signal on line-out. When the called party goes "off-hook," this condition is sensed by the central switching station of the called party and a telecommunication connection is established across the central switching station(s) as described above. In the event that the central switching station detects the called party in the off-hook condition at the time a central switching station is requested to ring the calling party, a line-busy signal is transmitted to the calling party by its central switching station. In order that the calling party can sense this signal, a line-busy signal detection circuit 115 is operably associated with line-out, and line-busy signal generation circuit 116 is operably associated with line-in as shown.

When the called party goes "off-hook" (e.g. picks up telephone instrument), several events occur virtually simultaneously. Firstly, the ring-back signal is ceased, as does the emulated ring-back signal. Secondly, ring-back detection circuit 37 senses line-out 26B for at least one ring-back pulse packet and then its disappearance. When the detection of such a signalling pattern occurs, then the system controller has determined that a telecommunication connection has been established across the central switching station(s) within the network. Thus, the system controller actuates telecommunication switch 27 to close, thereby connecting tip and ring lines of both lines-in and line-out. At this stage, the telecommunication process can be conducted through the switching network across the established telecommunication connection.

Thirdly, the system controller, having reset timer circuit 39, activates it to commence timing (i.e. measuring) the duration which the telecommunication connection across the central switching station is maintained. Under the control of the system controller, signals representative of elapsed time from timing circuit 39 are provided to data processor 40, as illustrated in FIG. 3A. In turn, data processor 40 processes telecommunication-time data prestored in telecommunication-time data storage unit (e.g. non-volatile EPROM) 41 so as to reflect decrements in prepurchased telecommunication-time essentially commensurate with the current amount of time elapsed from the commencement of the telecommunication connection. Preferably, during the telecommunication-time decrementing process, both the balance of prepurchased telecommunication-time remaining in the device and the running balance of time utilized during the ongoing telecommunication process, are visually displayed using a visual display means 42 operably associated with the system controller and data storage means 41. As shown, visual display means 42 comprises a display buffer 42A and a visual display device 42B configured in a conventional manner.

To alarm the calling party (i.e. prepaid subscriber) that a predetermined balance of available telecommunication-time remains in the telecommunication time metering device, alarm signaling circuit 43 is provided. Preferably, the system controller monitors the balance of time remaining in telecommunication-time data storage unit 41, and when a predetermined threshold is attained, the system controller activates alarm signaling circuit 43 to generate a user perceptible alarm signal. This alarm signal may be in the form of a visual indication on the visual display device, such as intermittent illumination of the telecommunication-time read out, an audible signal, or any other type of signal which suffices to alarm the user that prepurchased telecommunication-time is about to be depleted.

When prestored telecommunication-time data is decremented to represent that no (i.e. zero) prepurchased telecommunication-time remains in the metering device, several operations can occur. As will be described below, which operation occurs depends on the program mode selected by the user prior to commencing the telecommunication process.

In the event that the user desires to reenable rate-based cost computing at the central switching station after exhaustion of prepurchased telecommunication-time, a rate-reenable signal can be generated and transmitted over the telecommunication line to the central switching station. This rate-reenable signal can be realized as a momentary on-hook (i.e. open-circuit) condition created one or more times along the telecommunication line. In the illustrated embodiment, this rate-reenable signal is generated by the system controller cyclically deactivating and reactivating the telecommunication switch to open and close a predetermined number of times within a short time duration. The resulting line disturbance is detected at the central switching station and decoded as a request to reenable the use of rates to compute the cost of the remaining portion of the telecommunication connection. In such instances, two transaction records will, in effect, be generated for the telecommunication process which extends beyond available prepurchased telecommunication-time and into rate-reenable cost computation. Notably, the selection of this rate-reenable feature can be selected by the user by entry of an appropriate command code through keyboard data entry pad 44 operably associated with the system controller.

In some situations, the user may desire to simply terminate the telecommunication connection at the central switching station upon exhaustion of prepurchased telecommunication-time. In such situations, the user can select this option by entering an appropriate command code to the system controller by way of keyboard data entry pad 44. In some applications, the system controller may be preprogrammed to automatically provide this operating mode, unless commanded to operate otherwise by user.

Prior to utilization of telecommunication-time metering device 7, data representative of prepurchased telecommunication-time and a valid rate-disable number sequence must be loaded into the device. Also, data representative of each prepurchased subscriber may also be stored within non-volatile data storage unit 41 for subscriber registration and the like. Such types of data may be loaded into the device in a variety of ways.

In the preferred embodiment, telecommunication-time metering device 7 is adapted to receive such data by way of connection with a time-charging system (not shown). In such an embodiment, time metering device 7 is in communication with the time-charging system by way of the telecommunication switching network. As illustrated in FIG. 3A, time metering device 7 includes conventional communication processor 45 operably connected between line-out and the system controller. Communication processor 45 is capable of conducting necessary communication protocols with the time-charging system, receiving transmitted data and providing this data to the system controller for storage within a designated data storage unit. For example, prepurchased telecommunication-time data and prepaid subscriber identification data are transferred to non-volatile data storage unit 41 for storage, whereas a valid rate-disable number sequence is transferred to non-voltage storage unit 35 for storage.

In FIGS. 4 and 4A, an alternative embodiment of the telecommunication-time metering device of FIGS. 3 and 3A is illustrated. Device 71 is similar in virtually all respects, except for its method of storing telecommunication-time data. Whereas device 7 of FIGS. 3 and 3A includes fixed non-volatile data storage device 41, device 7' of FIGS. 4 and 4A includes a magnetic-strip reading/writing device 47 which can read from and write onto a portable structure such as a magnetic data-storage card 48. Preferably, the card is hand-holdable, disposable, and bears a magnetic strip which carries preferably at least digital data representative of (i) a prepurchased amount of telecommunication time, and (ii) a valid rate-disable number. In general, as a prepurchased call is being made, the data on the card is read, processed and rewritten to reflect decrements in the amount of prepurchased telecommunication-time which are essentially commensurate with the time duration of the telecommunication connection across the switching network. After exhaustion of telecommunication-time, the card can be either recharged by an authorized agent, or simply discarded.

Specifically, telecommunication-time metering device of FIGS. 4 and 4A includes a magnetic-strip data reading/writing unit 47 operably associated with the system controller and data processor 40', as shown. Magnetic-data storage card 48 of the type described above is inserted through the housing 49 of the metering device into data reading/writing unit 47. Initially, data relating to the rate-disable number sequence is read from the card by data reading/writing unit 47, and is provided to the system controller. In turn, this rate-disable number sequence is written into rate disable number storage unit 35. Then, as timing means 39 is initiated to measure the increasing tine duration of the established telecommunication connection across the central switching station(s), the signal (i.e. data) representative thereof is provided to data processor 40'. As timing means 39 measures the time duration, data reading/writing means 47 reads telecommunication-time and other data stored on the magnetic-strip card. This data is processed by data processor 40' to produce two items of data: data representative of the balance of remaining prepurchased telecommunication-time available, and data representative of measured time duration of the established telecommunication connection. These data items are written onto the magnetic-strip card by data reading/writing means 47. These data reading, processing and writing operations are continuously performed during the course of a telecommunication process conducted through the switching network. To advise the calling party of the status of available telecommunication-time remaining and the like, the above-described two data items can be visually displayed on visual display device 42B, on a continuous basis.

In FIGS. 5 and 5A, a telecommunication device 50 embodying the telecommunication-time metering apparatus of the present invention, is shown. As illustrated in FIG. 5A, this embodiment of the time-metered telecommunication device of the present invention includes all of the apparatus shown in FIGS. 4 and 4A, in addition to other operative components necessary for the desired operation of other embodiments. Despite the wide variations among envisioned time-metered telecommunication devices, such devices will typically include means for transmitting and receiving telecommunication signals (i.e. dialing and message carrying signals) generally represented by functional block 51. As shown, these signals are transmitted and/or received over line-in as illustrated in FIG. 5A. While not illustrated, time-metered telecommunication device 50 will include apparatus related to the particular communication operations performed by the telecommunication device. For example, in the case of a time-metered telephonic communication device, conventional telephonic instrumentation will be provided, along with necessary control circuitry and the like. In the case of a time-metered facsimile machine, facsimile scanning and recording apparatus will be provided, along with all necessary control circuitry and the like.

Referring to FIGS. 1 through 6B, the general system operation of telecommunication-time metering apparatus illustrated in FIGS. 3 through 5A, will now be described. For purposes of illustration only, the flow control process illustrated in FIGS. 6A and 6B refers to system components in the device of FIGS. 3 and 3A, although the embodiments of FIGS. 4, 4A, 5 and SA are clearly within the scope of such system operation, to be described below. Also, while the system operation provides prepayment service for only long-distance calls, local calls can be also accorded prepayment service as well. In such applications, appropriate control program modifications will be effected in a straightforward manner within the time-metered telecommunication device, central switching stations and associated billing systems.

Figure 6A:
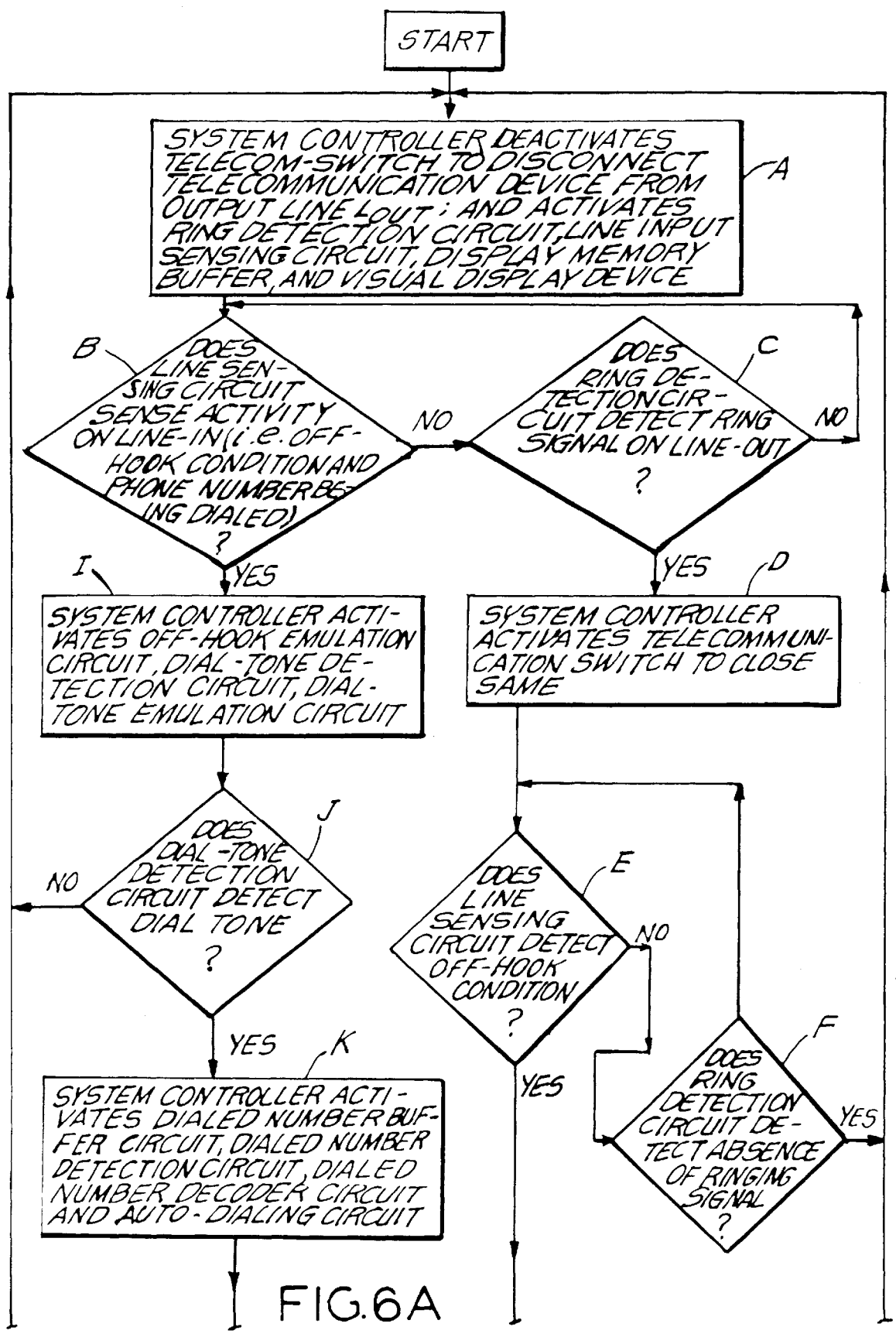
FIGS. 6A and 6B are high level control flow diagrams representative of the operations carried out by the control program of telecommunication-time metering apparatus embodied in the first, second and third embodiments of the present invention.
Figure 6B:
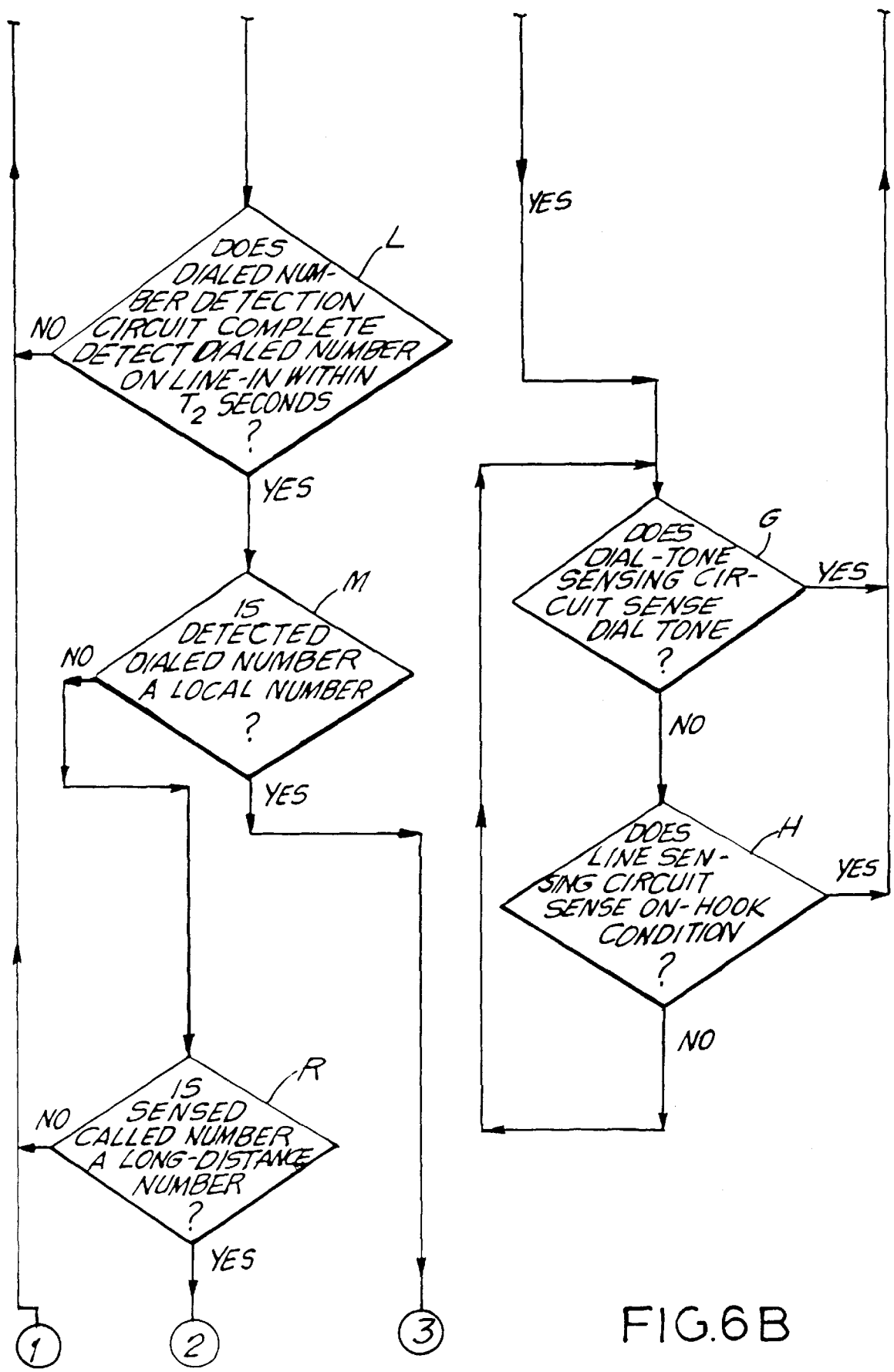
Figure 6C:
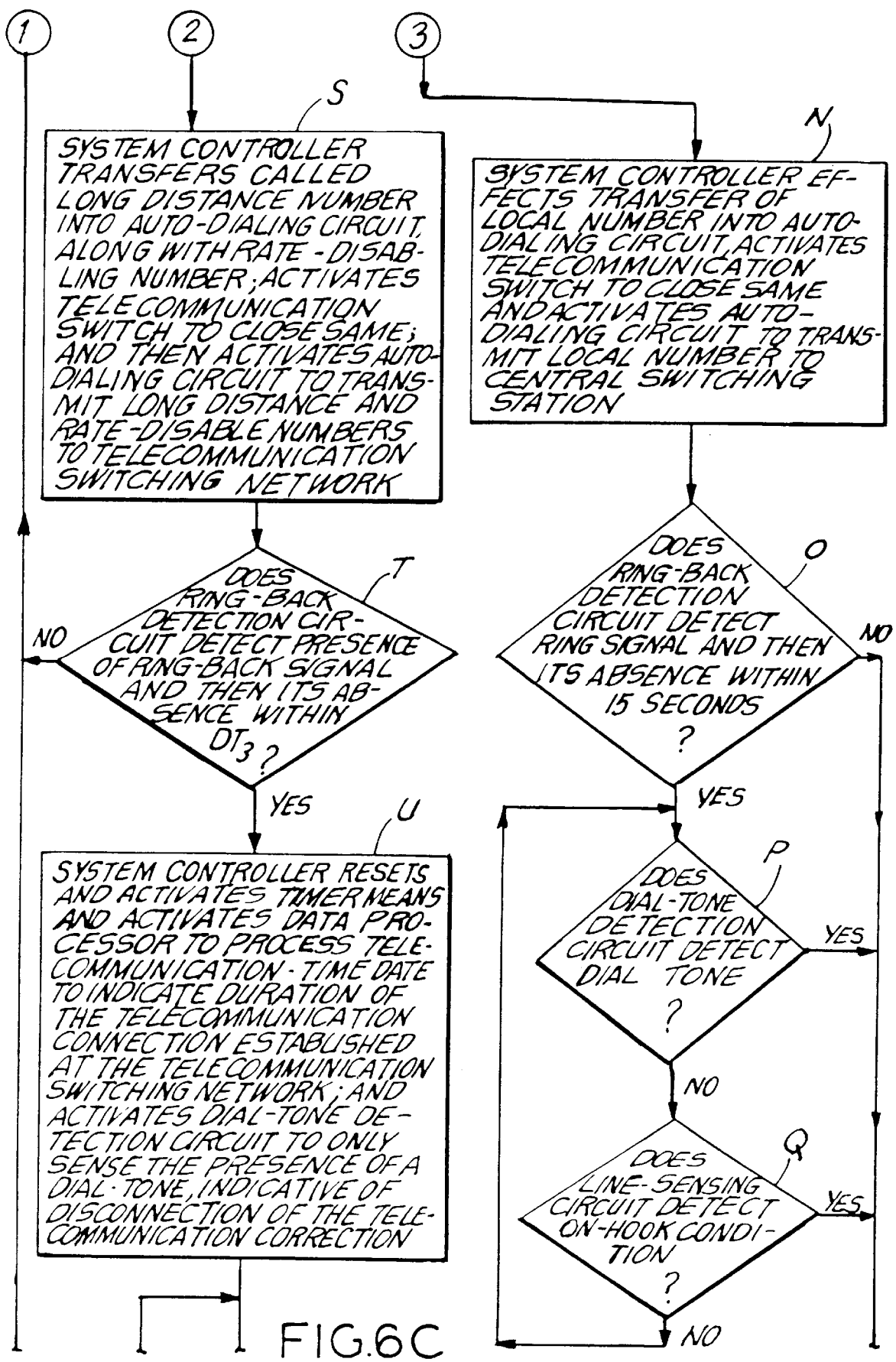
Figure 6D:
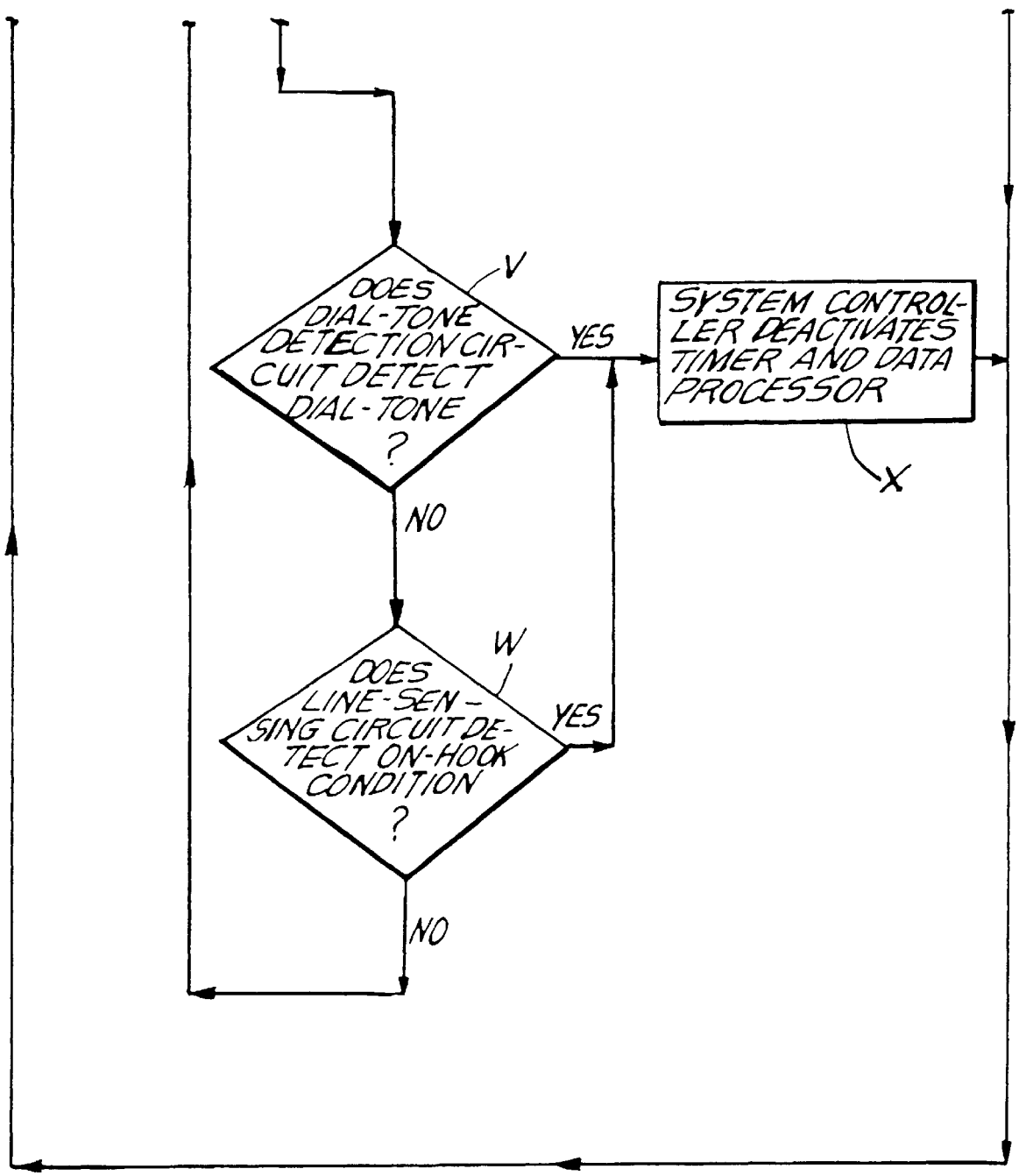

As illustrated in FIG. 6A, system operation starts by first connecting the time-metering device along a telecommunication line as described above, and then energizingly the same by engaging a power switch or the like.

As indicated at block A, the system controller deactivates telecommunication switch 27 to disconnect the associated (i.e. first) telecommunication device from line-out and thus the central switching station. Also, system controller activates ring detection circuit 37, line sensing circuit 28, display memory buffer 42A and visual display device 42B.

As indicated at Block B, the system controller determines whether line sensing circuit 28 detects activity on line-in, indicative of an off-hook condition. If this condition is not detected, then as indicated at Block C, the system controller determines whether ring detection circuit 37 detects a ringing signal on line-out. If a ringing signal is not detected, then the system returns to Block B to determine again whether an off-hook condition is detected. As illustrated, this decision process loop will continue indefinitely until either an off-hook condition or ringing signal is detected.

If a ringing signal is detected, then as indicated at Block D, the system controller activates telecommunication switch 27 to close. Then, the system controller enters a decision loop represented by Blocks E and F in order to determine whether the off-hook condition or ringing signal absence is detected. This system remains in this loop until one of these conditions is detected. If the ringing signal ceases prior to off-hook detection, the systems controller returns the system to the start state. If the off-hook condition is detected prior to cessation of the ringing signal, the system enters a decision loop represented by Blocks G and H.

As indicated at Block B, the system controller determines whether dial-tone detection circuit 30 detects a dial-tone, indicative that the calling party (i.e. second telecommunication device) has gone into the off-hook condition (i.e. has decided to hang up). This event will prompt the central switching station to generate a dial-tone signal since the first telecommunication device is still in the off-hook condition. In response, the system controller returns the system to the start state, as shown. If, however, a dial-tone is not detected, then as indicated at Block H the system controller determines whether line sensing circuit 28 detects an "on-hook" condition at the first telecommunication device. If this condition is detected, indicative that the first telecommunication device has hung-up, then the system controller returns the system to the "start" state. If the on-hook condition is not sensed, then the system controller determines again whether a dial-tone has been detected. As illustrated in FIG. 6A, this decision process loop is repeated indefinitely so long as the telecommunication process continues.

As indicated at Block B, if the system controller determines that the "off-hook" (e.g. pick-up) condition has been detected, indicative that an outgoing call is about to be instituted, then the system controller activates the off-hook emulation circuit 29, dial-tone detection circuit 30, and dial-tone emulation circuit 31, as indicated at Block I. Then, as indicated at Block J, the system controller determines whether dial-tone detection circuit 30 detects a dial-tone on line-in. If a dial-tone signal is not detected within a predetermined period of time $T_1$, e.g. 5 seconds, then the system controller returns the system to the "start" state. If, on the other hand, a dial-tone is detected within this time period, the system controller activates dial-tone emulation circuit 31 to emulate a dial-tone signal on line-in, and activates dialed number detection circuit 32, dialed number buffer circuit 33, dialed number decoder circuit 34 and auto-dialing circuit 36, as indicated at Block K.

As indicated at Block L, the system controller then determines whether dialed number detection circuit 32 detects a complete dialed number on line-in within a predetermined time period $T_2$, e.g. 15 seconds after detection of the "off-hook" condition. As indicated at Block M, if a complete dialed number is detected, then system controller determines whether decoder circuit 34 has detected a local number. If a local number has been detected, then as indicated at Block N the system controller orchestrates the operation of circuits 33, 35 and 36 50 that the local dialed number is loaded into auto-dialing circuit 36, telecommunication switch 27 is closed, and auto-dialing circuit 36 dials-out the local number to the central switching station. At this stage of the process, the central switching station processes the local number, as hereinbefore described, carrying out conventional telecommunication protocols with other central switching stations selected in order to connect the first telecommunication device (i.e. the calling party) with the second telecommunication device (i.e., the called party).

As indicated at block O, the system controller determines whether ring-back detection circuit 37 detects the ring-back signal from the central switching station within a predetermined time period $T_3$, e.g. 15 seconds. If the ring-back signal is not detected within this time period, then the system controller returns the system to the "start" state. If, on the other hand, the ring-back signal is detected within this time period, then as indicated at Block P the system controller determines whether dial-tone detection circuit 30 detects a dial tone. If it does, then the system controller returns the system to the start state. If not, then as indicated at Block Q, the system controller determines whether line sensing circuit 28 detects the "on-hook" condition. If the on-hook condition is detected, then the system controller returns the system to the start state, as illustrated. If the on-hook condition is not detected, then the system determines whether the dial-tone is detected. This decision process loop is repeated indefinitely until either a dial tone or on-hook condition is detected.

As indicated at Block M, if a local number is not detected by decoder circuit 34, then the system controller determines whether decoder circuit 34 detects a long-distance number. As indicated at Block R, if a long-distance number is not detected, then the system controller returns the system to the start state. If, on the other hand, a long-distance number is detected, then as indicated at Block S the system controller orchestrates circuits 33, 35 and 36 so that (i) the long-distance number is loaded into auto-dialing circuit 36 in front of the rate-disable number to form a composite number, (ii) telecommunication switch 27 is closed, and (iii) the composite number is out-dialed by auto-dialing circuit 36 to the central switching station.

As indicated at Block T, the system controller determines whether ring-back detection circuit 37 detects the presence of a ring-back signal and then its absence within a predetermined time period $T_3$, e.g. 15 seconds. If this ring-back signal pattern is not detected within the predetermined time period, then the system controller returns the system to the start state. If, however, this ring-back signal pattern is detected within the predetermined time period, then as indicated at block U the system controller resets and activates timing means 39 and activates data processor 40. Then data processor 40 continually processes telecommunication-data within data storage unit 41 so as to produce two items of data: data representative of the running balance of remaining prepurchased telecommunication-time available, and data representative of the measured time duration of the established telecommunication connection. This data processing continues for the duration of the telecommunication connection across the central switching station(s), so that prepurchased telecommunication-time is periodically decremented while the above data items are visually displayed on visual display device 42B.

With dial-tone detection circuit 30 and line-sensing circuit 28 both activated, the system controller then enters decision process loop indicated at Blocks V and W, which are identical to Block P and Q, respectively. When either a dial-tone or on-hook condition is detected, the system controller immediately deactivates timing means 39 and data processor 40, returning the system to the start state, as indicated at Block X. This ceases the expenditure of prepurchased telecommunication-time, as the telecommunication process has been terminated by one of the parties.

Figure 7:
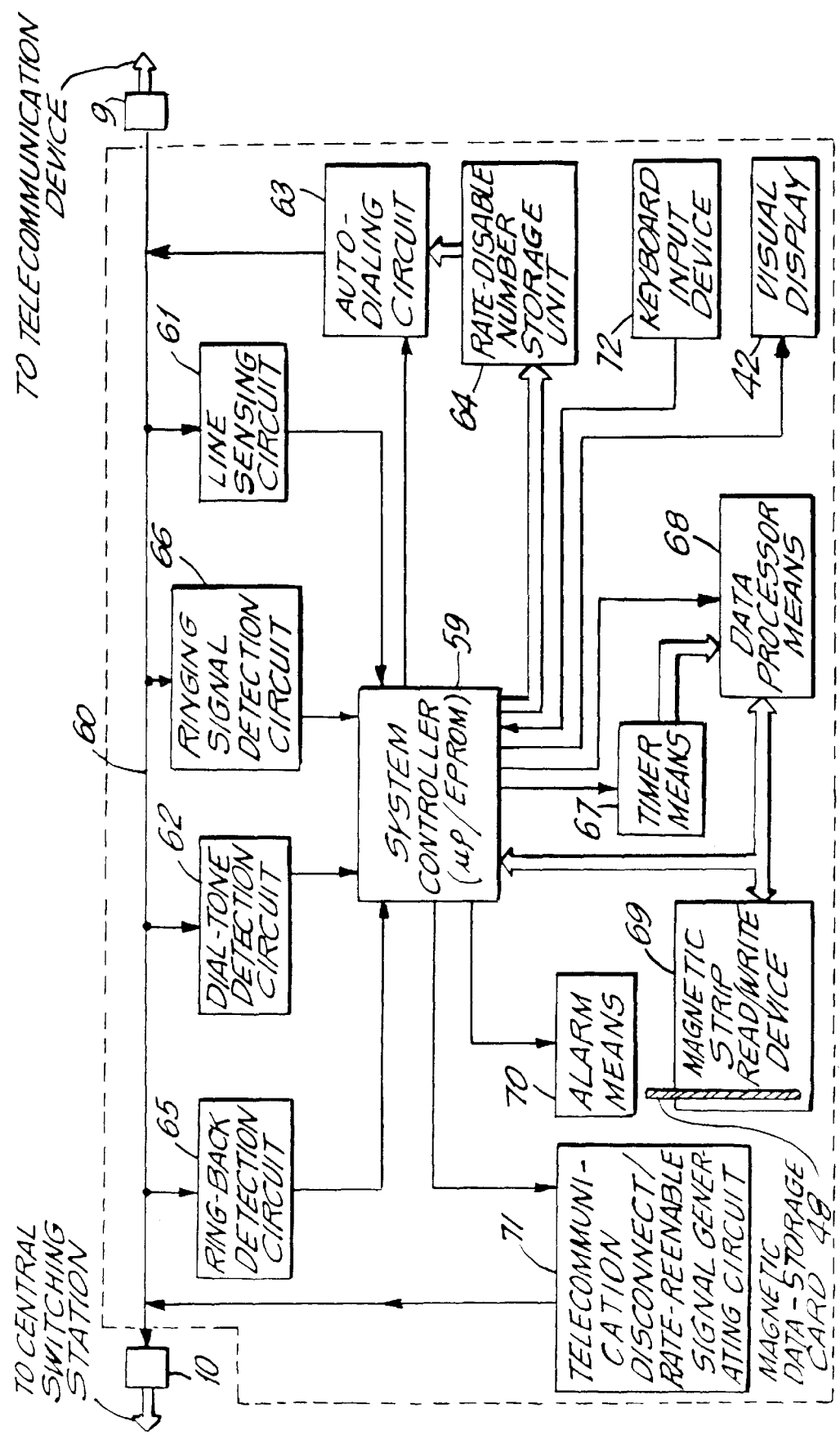
FIG. 7 is a block functional diagram of an alternative embodiment of the telecommunication-time metering device of the present invention.

Referring to FIG. 7, an alternative embodiment of telecommunication-time metering apparatus of the present invention is shown. This device is generally compatible with the central switching station and billing system of FIG. 2, will be described below.

For purposes of illustration only, the apparatus of this particular embodiment of the invention is embodied in a telecommunication-time metering device of the type generally shown in FIG. 4, although its use is in no way limited to such applications. Notably, while this device is similar in many respects to the device illustrated in FIG. 4A, there is a fundamental difference. Specifically, the device of FIG. 7 does not include a telecommunication switch between input and output ports 9 and 10, respectively. Instead, when the device is installed in-line, the associated telecommunication device is always in communication with the central switching station, as illustrated in FIG. 7. Consequently, the structure and operation of the system components and controller are modified from the previously described embodiment in a manner to be described in detail below.

Referring to FIG. 7, telecommunication-time metering device 7" is shown to comprise a number of components, all of which are operably connected to and are under the control of system controller 60, which is preferably realized in the form of a microprocessor and associated EPROM as program memory for storage of the control program. While not shown, battery power circuitry is provided in a conventional manner. Also, data and address buses are not shown for purposes of simplification and to avoid obfuscation of the present invention.

Between input plug 9 and output jack 10 telecommunication line 60 is provided having ring (R) and tip (T) lines in the conventional manner. In order to detect whether the telecommunication device connected to input port 9 is in the "off-hook" condition and thus ready to transmit a dialing signal (i.e. called party number), line sensing circuit 61 is provided. When the off-hook condition is detected, dial-tone detection circuit 62 is activated and begins sensing for a dial-tone signal generated by the central switching station. When a dial-tone is detected, the system controller activates auto-dialing circuit 63 which is associated with rate-disable Number storage unit 64. This event causes auto-dialing circuit 63 to automatically generate a signal representative of a rate-disable number prestored in storage unit 64, and transmit the same onto line 60, through output port 10 and to the central switching station. This signal generation and transmission process occurs virtually instantaneously ensuring that the rate-disable number is stored first in the input buffer of the central switching station, and collision with the dialed out number is avoided. Notably, however, the order of these two number sequences is not essential to the invention.

The first telecommunication device will then transmit a dialed (i.e. called) number which is received subsequently in the incoming buffer. The rate-disable and dialed number from a composite number in the incoming number buffer of the central switching station. This composite number is then decode processed at the central switching station to determine whether a local or long-distance number has been received. In the case where only long-distance numbers are eligible for prepayment service according to the present invention, processing of incoming dialed numbers at the central switching station to ensure this condition. In particular, if a local number is detected by decode processing, then transaction record data will be generated in the normal course for the placed call, without generation of rate-disable data. Consequently, such transaction-records will be stored in second data storage means 16 of the billing system, and be subject to rate-based cost computations as described hereinabove. If a long distance number is detected by decode processing, then a transaction record with rate-disable data will be generated for each long-distance call in a manner previously described. Such transaction records will be stored in first data storage means 15 of FIG. 2 and will not be subject to cost computations.

As illustrated in FIG. 7, telecommunication-time metering device 7" further includes ring-back signal detection circuit 65 which permits detection (i.e. monitors) of the ring-back signal from the calling party's central switching station when the ringing signal is transmitted over the called party's telecommunication line. When the ring-back signal disappears from the telecommunication line, indicative that the called party has entered the "off-hook" condition, then the central switching station(s) establish a telecommunication connection between the calling parties, as described hereinabove. Telecommunication metering device 7" also includes a ringing signal detection circuit 66, which detects the presence of a ringing signal generated on lines 4 and 60 by the central switching station in response to a second telecommunication attempting to call the first telecommunication device.

To measure the time duration of each established telecommunication connection, resettable timing means 67 is operably connected to the system controller and data processing means 68. The data output of timing means 67 is provided to data processing means 68. Using time-data provided from timing means 67, data processing means 68 processes telecommunication-time data read from magnetic-strip card 48 using magnetic-strip reading/writing device 69. In response, data processing means 68 produces data including data representative of the running balance of remaining prepurchased telecommunication-time available, and data representative of the measured time duration of the established telecommunication connection. All during the telecommunication connection across the central switching station(s), prepurchased telecommunication-time is decremented while the above data items are visually displayed on visual display device 42B.

In order to alarm the user that the available prepurchased telecommunication time has been reduced to a predetermined level, alarm means 70 is provided as hereinbefore described. Also, time metering device 7" includes signal generating circuit 71 capable of selectively generating a telecommunication-disconnect signal or rate-reenable signal. This circuit operably connected to the telecommunication line 60 and the system controller, permits the user a choice of continuing an ongoing telecommunication process subject to rate-based cost computing when prepurchased telecommunication time is completely exhausted. For example, using keypad data entry device 72, the user can program the system controller (i.e. its control program) to cause signal generating circuit 71 to generate and transmit a rate-reenable signal pattern to the central switching station, as described previously. This signal when received at the central switching station and billing system, will reenable the use of rate schedules and automatically generate a second transaction record for that portion of the telecommunication process extending beyond prepayment servicing. The second transaction record will be subject to rate-based cost computation, while the first transaction record for the first portion of the telecommunication process has been subject to prepayment servicing according to the present invention.

Alternatively, instead of such split transaction records, the user can program the system controller to automatically cause signal generating circuit 71 to generate a telecommunication disconnect signal pattern which is transmitted to the central switching station upon depletion of prepurchased telecommunication-time. When received, this signal will be decoded as authorization to terminate the telecommunication connection.

Figure 8A:
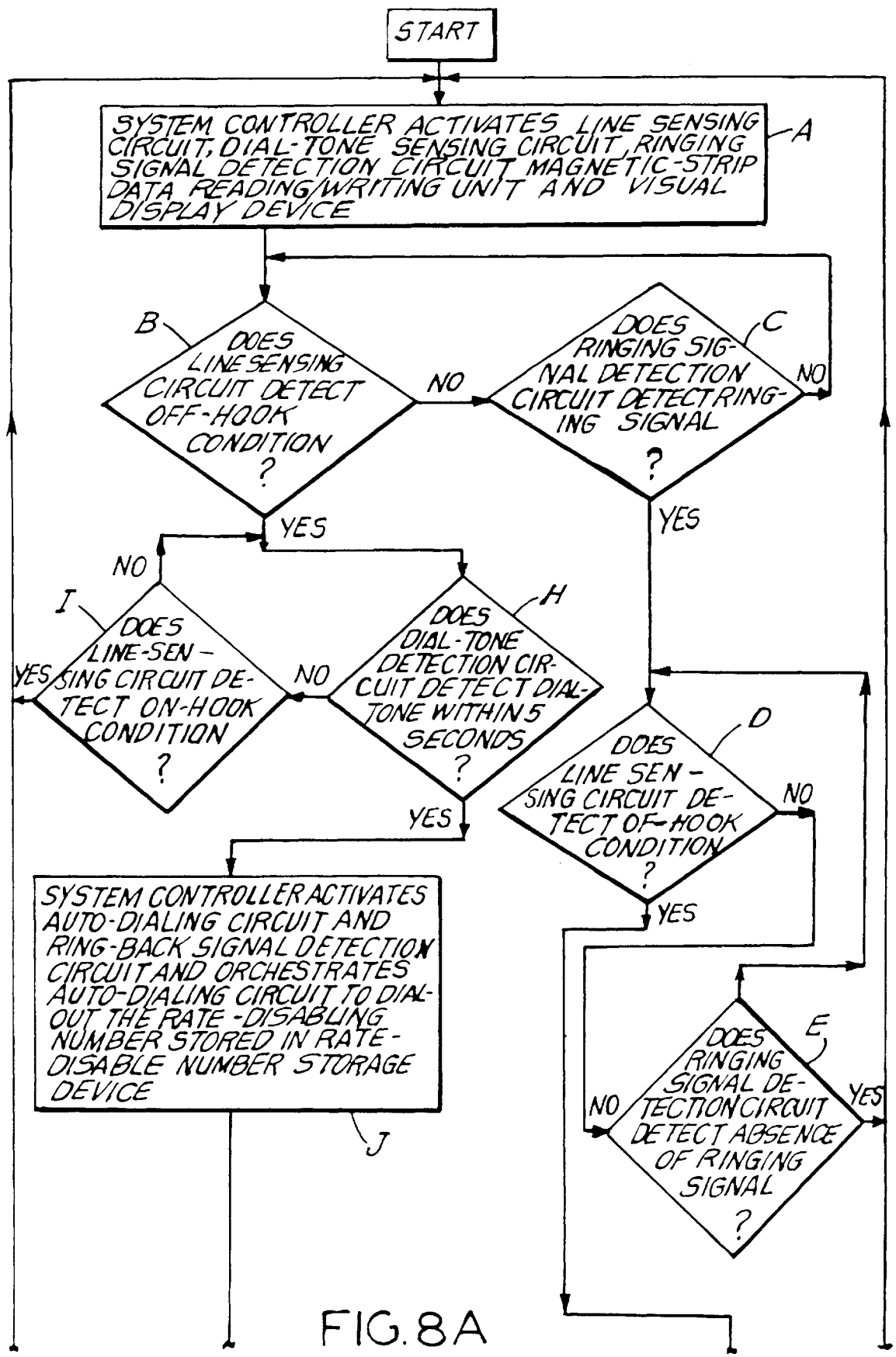
FIGS. 8A and 8B are high level control flow diagrams representative of the operations carried out by the control program of telecommunication-time metering device illustrated in FIG. 7.
Figure 8B:
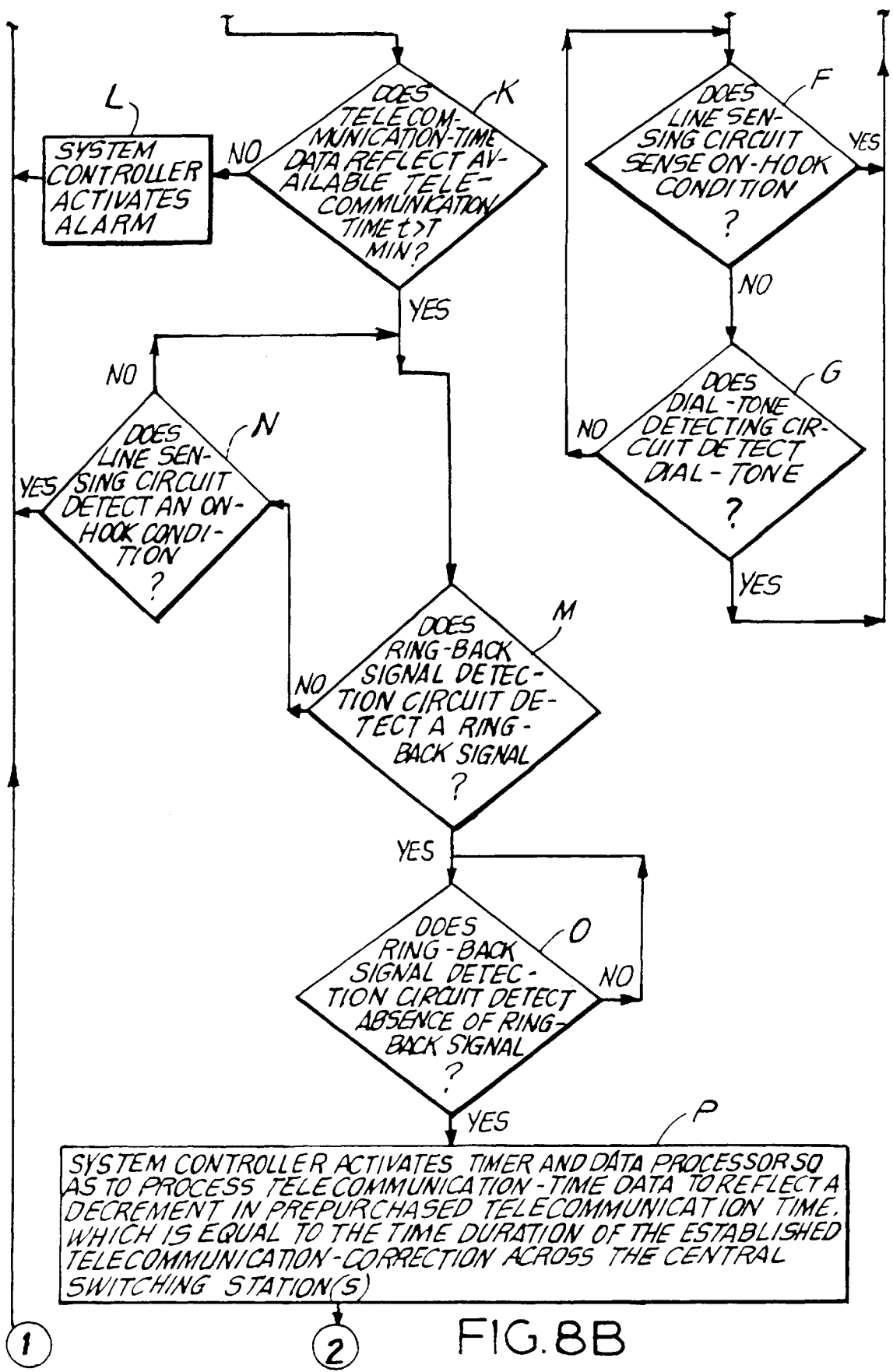
Figure 8C:
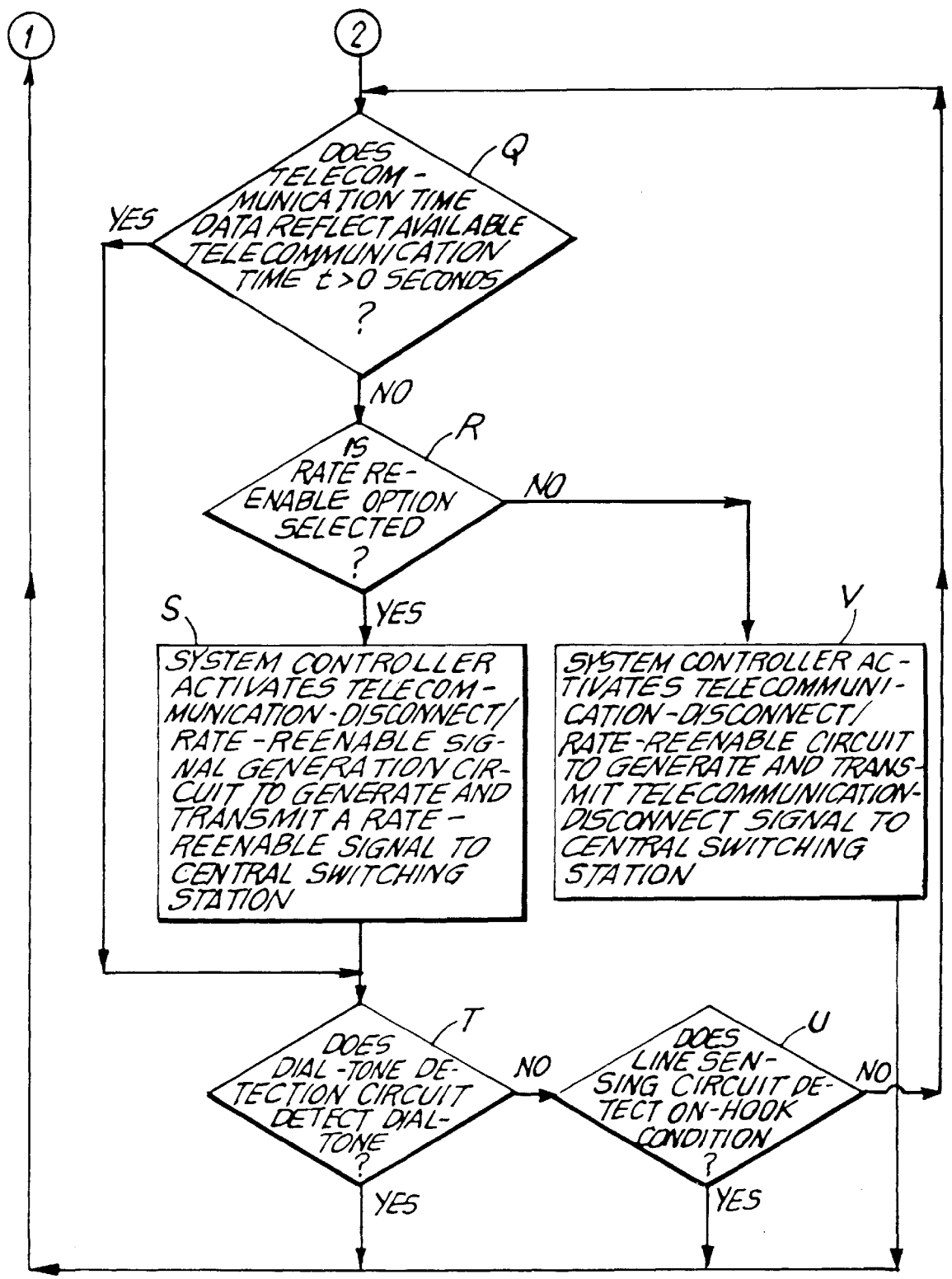

Referring to FIGS. 7, 8A and 8B, the general system operation of telecommunication-time metering apparatus illustrated in FIG. 7, will now be described. For purposes of illustration only, the flow control process illustrated in FIGS. 8A and 8B makes reference to system components in FIG. 7, although other embodiments are clearly within the scope of such system operation, to be described below. Also, while the system operation provides prepayment service for only long-distance calls, local calls can be accorded prepayment service as well as programming the system controller, central switching station and associated billing system in a straightforward manner.

As illustrated in FIG. 8A, system operation starts by first connecting the time-metering device along a telecommunication line as described above, and energizing the device by way of engaging a power switch or the like.

As indicated at Block A, the system controller activates line sensing circuit 61, dial-tone sensing circuit 62, ringing signal detection circuit 66, magnetic-strip data reading/writing unit 69 and visual display means 42. Then, as indicated at Block B, the system controller determines whether line sensing circuit 61 detects the off-hook condition at the associated (i.e. first) telecommunication device. If the off-hook condition is not detected, then the system controller determines whether ringing signal detection circuit 66 detects a ringing signal. If the ringing signal is not detected, then as indicated at Block C the system controller proceeds to determine again whether the off-hook condition is detected. This decision process loop is repeated indefinitely until either the off-hook condition or ringing signal is detected. If the system controller determines that ringing signal detection circuit 66 has detected a ringing signal, then the system controller enters the decision loop represented by Blocks D and E in order to determine whether the off-hook condition or ringing signal absence is detected. The system remains in this decision loop until one of these conditions is detected. If the ringing signal ceases prior to off-hook detection, the system controller returns the system to the start state. If the off-hook condition is detected prior to cessation of the ringing signal, the station enters a decision loop represented by Blocks F and G.

If the system controller determines that line sensing circuit 61 detects an off-hook condition at Block D, then the system controller enters a decision loop represented by Blocks F and G. Once within this loop, the system controller will remain within this loop until it determines that either an on-hook condition or a dial-tone signal is detected, and upon such detection returns the system to the start state as illustrated.

If the system controller determines at Block B that line sensing circuit 61 has detected an off-hook condition, then as indicated at Block H the system controller determines whether dial-tone detection circuit 62 receives a dial-tone signal from the central switching station within, for example, 5 seconds. If a dial-tone signal is not detected, then as indicated at Block I the system controller determines whether line sensing circuit 61 detects an on-hook condition. This process continues indefinitely until either a dial-tone is detected indicative that a dialing signal may be dialed out, or the on-hook condition is detected indicative that the first telecommunication device hung up. If the on-hook condition is detected, then the system controller returns the system to the start state. If, on the other hand, the dial-tone is detected, then as indicated at Block J the system controller activates auto-dialing circuit 63, rate-disable number storage unit 64, and ring-back signal detection circuit 65. In addition, system controller orchestrates auto-dialing circuit 63 and rate-disable number storage unit 64 80 as to generate and transmit the rate-disable number (i.e. code) to the central switching station. Thereafter, the associated telecommunication device will typically transmit either a local or long-distance dialing number to the central switching station, where both of these numbers are stored in a buffer and decode processed in a manner described hereinabove. Notably, while this rate-disable number is transmitted prior to the dialed-out number, in other embodiments of the invention the order of such events can be reversed in a straightforward manner, with decode processing at the central switching station being modified to accommodate such changes.

As indicated at Block K, the system controller determines whether telecommunication-time data stored in storage unit 69 reflects an available amount of telecommunication-time in excess of a predetermined minimum amount $T_{MIN}$. If such time if not available, then system controller activates alarm means 70 as described hereinabove. If at least the minimum amount of telecommunication-time exists, then the system controller enters a decision loop represented by Blocks M and N.

As indicated at Blocks N and N, the system controller determines whether ring-back detection circuit 65 detects the ring-back signal from the central switching station, or whether line sensing circuit 61 detects an on-hook condition. If the ring-back detection signal is not detected, then as indicated at Block N the system controller determines whether line sensing circuit detects an on-hook condition. If an on-hook condition is detected, indicative that the calling party chose to hang-up, then the system controller returns the system to the start state, as shown. If, however, an on-hook condition is not detecting Block N is reentered to determine again whether a ring-back signal is detected. This loop will be cycled indefinitely, until a ring-back signal or on-hook condition is detected. When a ring-back signal is detected, then as indicated at Block O, the system controller determines whether ring-back signal detection circuit 65 detects the absence of the ring-back signal, indicative that the called party (i.e. second telecommunication device) has gone off-hook and the central switching station(s) has established a telecommunication connection. When this event is detected, then as indicated at Block P, the system controller resets and starts timing unit 67, and activates data-processing unit so as to process telecommunication-time data stored on magnetic data card 48. Such processing should reflect decrements in prepurchased telecommunication-time which is essentially equal to the time duration of the established telecommunication connection across the central switching stations. During this process, the visual display device displays the two data-items described hereinabove.

As indicated at block Q in FIG. 8B, the system controller then determines whether telecommunication-time data stored on the magnetic data card reflects an available amount (i.e. t>0) of prepurchased telecommunication-time. If available telecommunication-time exists, then as indicated at Blocks T and U, the system controller determines whether a dial-tone signal or an on-hook condition is detected, indicative that one of the parties has terminated the telecommunication process. If one of these conditions is detected, then the system controller returns the system to the "start" state. If, however, one of these events is not detected, then the system controller returns to block Q to determine whether telecommunication-time still exists and thus available for prepayment service. This decision loop is continuously repeated so long as telecommunication-time is available and neither party has terminated the telecommunication process.

If the system controller determines that telecommunication-time has been completely exhausted during an on-going telecommunication process, then as indicated at Block R, the system controller determines whether the rate-reenable option has be selected by the user. If this option has been selected, then as indicated at Block S the system controller activates signal generation circuit 71 to generate and transmit a rate-reenable signal to the central switching station. Upon receiving this signal, the central switching station will buffer and decode process it so as to reenable rate utilization as hereinbefore described. Then, as indicated at Blocks T and U, the system controller determines whether a dial-tone signal or an on-hook condition is detected, indicative that the telecommunication process has been terminated. If neither of these conditions are detected, then the system controller returns to Block Q, as illustrated in FIG. 8B, and flows through T and U. Upon detection of one of these conditions, the system controller will return the system to the start state.

If, on the other hand, at Block R the rate-reenable option has not been selected, then upon depletion of prepurchased telecommunication-time, the system controller activates signal generation circuit 71 to generate and transmit a telecommunication-disconnect signal. Upon receiving this signal, the central switching station buffers and decode processes this signal, and then disconnects the telecommunication connection(s) across the telecommunication switching network, and generates a transaction record as described hereinabove. Simultaneously, the system controller returns the system to the start state.

The above-described telecommunication-time metering apparatus has illustrated a single data storage device for a single subscriber line. However, according to the present invention, a plurality of telecommunication lines can be operably associated with a single remote telecommunication-time metering device which is capable of providing prepayment for telecommunication connections. In one such embodiment, the time metering device includes means for registering the members (i.e. telecommunication lines) of a prepaid subscriber (or sponsored) group, and means for storing a reserve of prepurchased telecommunication available to members of the registered group. Such prepurchased telecommunication-time, being represented by telecommunication-time data, would be stored in the group time data storage device. This local pool of telecommunication-time data would be processed each time a subscriber line establishes a telecommunication connection at the central switching station. As in the other embodiments, the time data would be decremented by an amount essentially equal to the measured time duration of each telecommunication connection procured. As this reserve of telecommunication-time is depleted, it can be replenished as required or desired.

Figure 9:
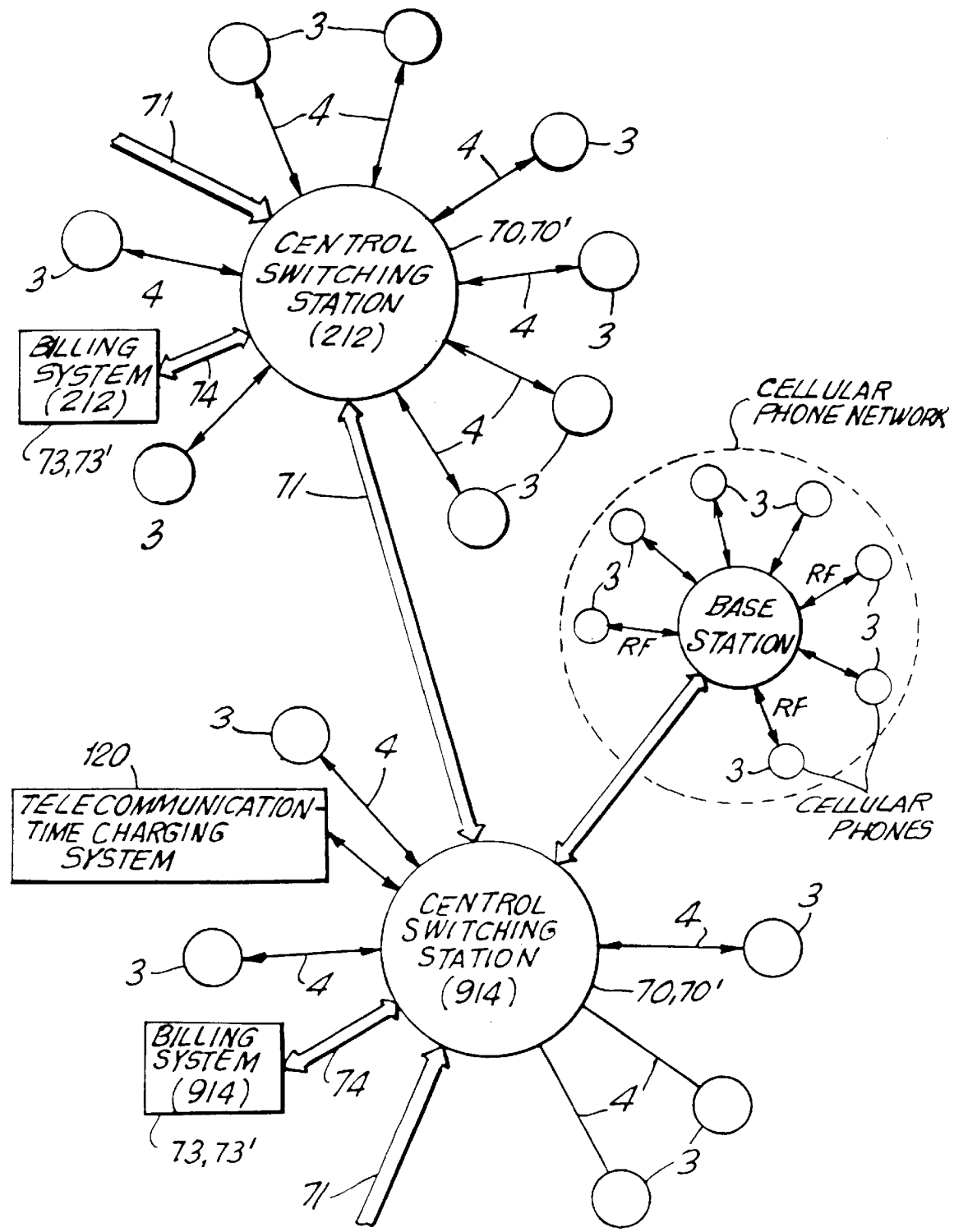
FIG. 9 is a schematic representation of a telecommunication switching network according to the second aspect of the present invention, showing a plurality of central switching stations in communication with each other by way of trunk-line circuits, billing systems according to the present invention in operable association with respective central switching stations, and a plurality of conventional telecommunication devices each connected to a central switching station by way of an assigned telecommunication line.
Figure 10:
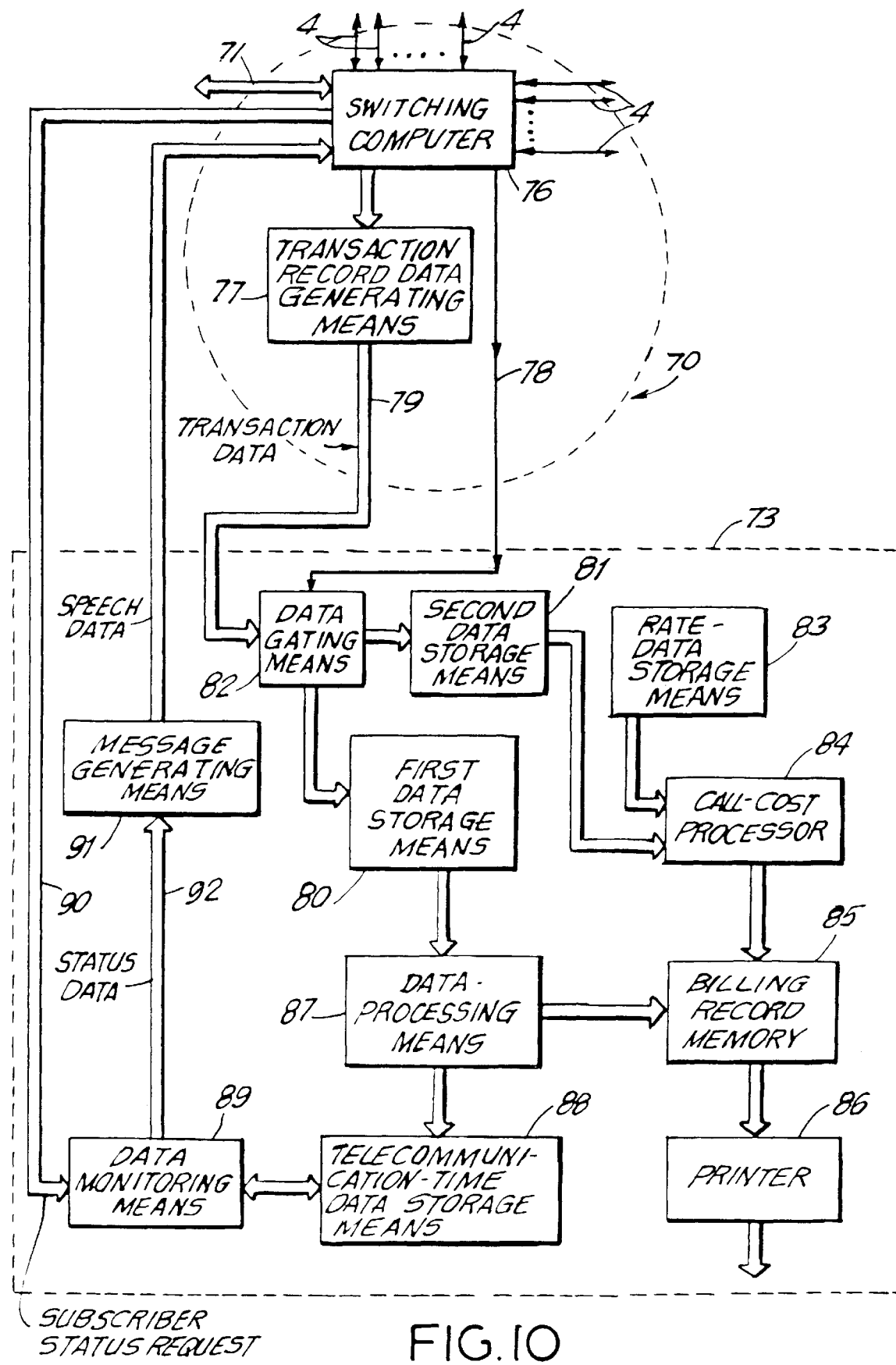
FIG. 10 is a block functional diagram of a first embodiment of the central switching station and billing system of the second aspect of the present invention, which are configurable within the telecommunication switching network of FIG. 9.
Figure 11:
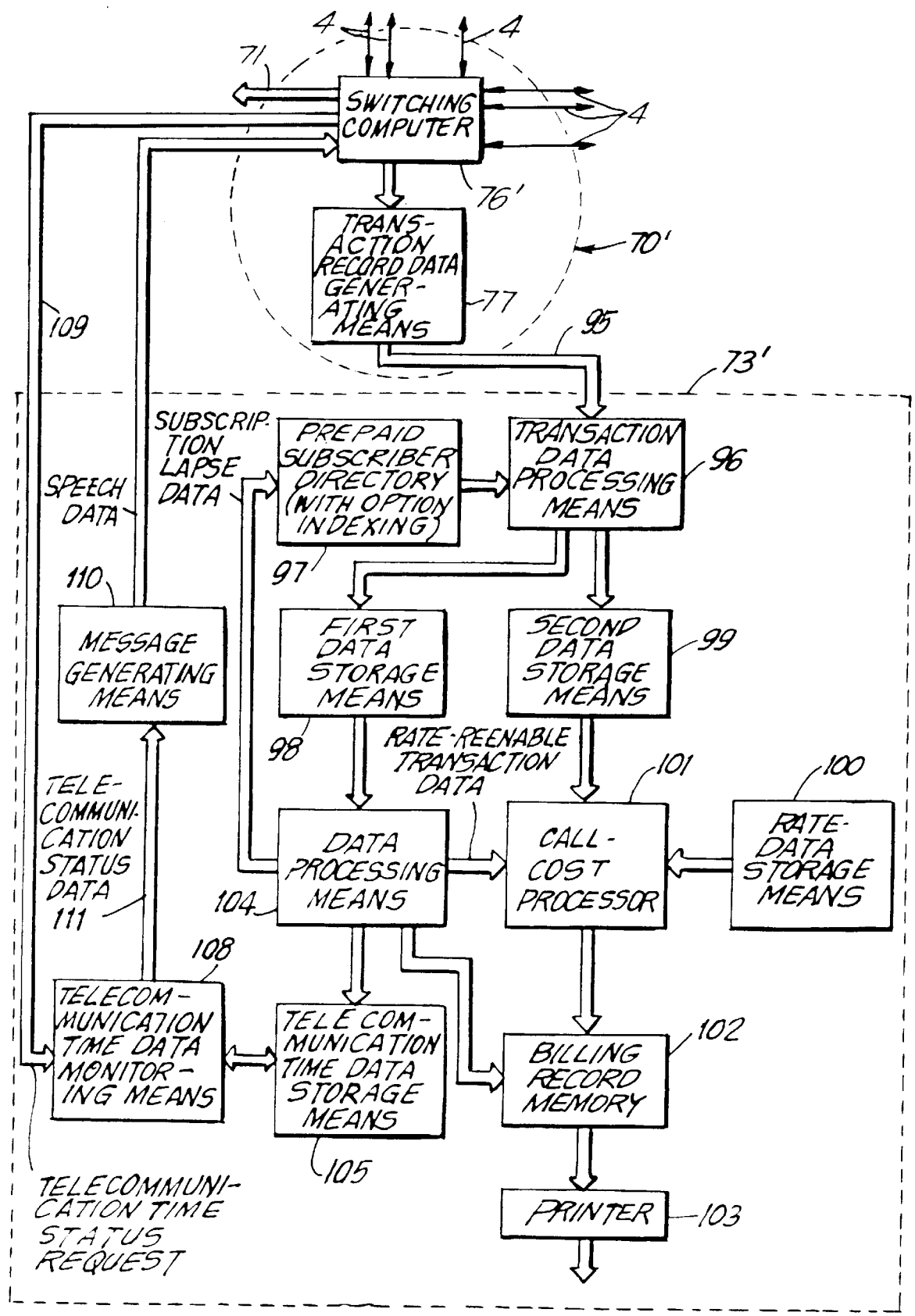
FIG. 11 is a block functional diagram of a second embodiment of the central switching station and billing system of second aspect of the present invention, which are configurable within the telecommunication switching station of FIG. 9.

Referring to FIGS. 9, 10 and 11, the method and apparatus for prepayment of telecommunication processes according to the second aspect of the invention, will now be described.

In FIG. 9, a portion of public telecommunication switching network according to the second aspect of the present invention, is schematically illustrated. As in the first aspect of the present invention, only central switching stations and associated billing systems for two area codes, i.e. 914 and 212, are shown. Central switching station 70 for area code 914 is in communication with central switching station 70 for area code 212 by way of trunk-line circuit 71 well known in the art. Each central switching station is connected to subscriber telecommunication devices 3 by way of a respective telecommunication line 4 that has been assigned a unique calling number by its central switching station. In order to compute the cost for each telecommunication process conducted through the telecommunication switching network and account for these charges over time for subscriber billing purposes, billing system 73 is operably connected to each central switching network by way of lines 74. Typically, the billing system associated with the central switching station of the "calling" telecommunication device (i.e. line) will compute and account for call costs. Utility fees owing to other central switching stations for use of their lines and equipment during long-distance calls, can be accounted for and paid in a conventional manner well known in the art.

According to the second aspect of the present invention each telecommunication device within the switching network of FIG. 9 is preferably a conventional telecommunication device, e.g. telephonic instrument or facsimile machine, without telecommunication-time metering capabilities required in the first aspect of the invention. Instead, telecommunication-time metering capabilities are realized preferably at each central switching station and/or billing system within the network. This approach places greater requirements at each central switching station while virtually eliminating any additional requirements or modifications at the subscriber devices within the network.

In FIG. 10, the first embodiment of the central switching station and associated billing system according to the second aspect of the invention, is schematically illustrated.

As shown in FIG. 10, each central switching station (e.g. central office or remote housing) 70 of the greater telecommunication switching network comprises a telecommunication switching means 76 and transaction data generating means 77. Preferably, telecommunication switching means 76 is realized in the form of a high-speed switching computer that is specially adapted for establishing interconnections between two or more telecommunication lines, designated by the numbers of the calling and called parties. Typically, switching computer 76 is capable of establishing such telecommunication connections between any two or more telecommunication lines, among potentially millions of local subscriber lines within a given area-code serviced by a central switching station. In addition, the switching computer 76 includes circuitry for measuring the time duration of each telecommunication connection made, accepting signalling information (i.e. on-hook, off-hook, and dialing signals) and carrying out telecommunication functions, including generation and transmission of dial tone signals, ringing signals, ring-back signals, line busy signals and the like, all of which are well known in the art. For calls outside the local area-code (i.e. long-distance calls), trunk-line circuits 71 are operably connected to switching computer 76 in a conventional manner. These and other functions are provided, as discussed, for example, in "Digital Transmission Building Blocks," incorporated by reference above.

Switching computer 76 also includes incoming-number buffering circuitry and decoding circuitry for decoding incoming number sequences using a variety of code detection processes. In the case of the second aspect of the present invention, such code detection processes would include, for example, area-code detection, rate-disable detection and rate-reenable detection. Notably, the output of the rate-disable code detection process will be rate-disable data 78 that is provided to billing system 73 along with the transaction record data produced from transaction generating means 77 at the termination of each telecommunication process. Transaction record data generating means 77 is realized as apparatus capable of generating transaction record data 79 including the numbers of the calling and called parties, and the time, date and measured time duration of the telecommunication connection. For purposes of illustration only, data items 78 and 79 are schematically shown in FIG. 10 as being transmitted to billing system 73 by way of separate lines.

As illustrated in FIG. 10, each billing system 73 comprises first and second data storage means 80 and 81, data gating means 82, rate-data storage means 83, cost processing unit 84, billing record storage means 85 and record printing means 86. First and second data storage means 80 and 81 can be any memory device which stores transaction data records produced from central switching station 70 for each telecommunication process conducted. While illustrated as separate units, first and second data storage means 80 and 81 can be realized in single data storage device whose storage space is ramified into two separate subspaces. Transaction-record data produced for each prepaid telecommunication connection is stored in first data storage means 80. Notably, depending on the specific type prepaid service offered by the telecommunication carrier, different criteria will be used to determine in which storage means a particular transaction record should be stored for subsequent use and processing. For example, in the case where only prepaid subscriber lines are eligible for prepaid service, then the calling party's number will be analyzed to determine proper transaction record storage. In the case where the subscribing party offers an "800" number for incoming calls from non-subscribing parties, then transaction records will be also analyzed for "800" area codes and called party numbers.

Transaction-record data produced for each non-prepaid telecommunication process is stored in second data storage means 81 for subsequent cost computation. As illustrated, such data is directed into these storage means by providing data gating means 82 with control data produced from the switching computer carrying out disable-rate code detection processing. Both types of transaction record data can be organized in a variety of ways, for example, according to (i) the number of each telecommunication line allocated by the central switching station, or (ii) a subscriber number assigned to each subscriber of prepaid telecommunication-time service.

To compute the cost for each transaction, rate-data from rate-data storage means 83 and transaction record data from second data storage means 81 are both provided to cost processor 84, as shown. In general, cost processor 84 can be any suitably programmed device, such as a general purpose computing system with appropriate software for cost computation. Typically, rate-data is a function of the time, day and duration of the call, and thus such information from each transaction record will be used to select the applicable cost rate from rate-date storage means.

For each transaction record provided to cost processor 84, a billing record is generated and stored in billing record storage means 85. Preferably, for subscribers allocated a telecommunication line, billing record data in billing record storage means 85 is organized according to numbers assigned to these telecommunication lines. In this way, a complete monthly billing record can be readily generated for each number (i.e.. subscriber), and printed out by printing means 86 for mailing to customers in a conventional fashion.

For prepaid subscribers without an allocated line, transaction record data can be organized according to an assigned subscriber number. Notably, such organized transaction record data will be used for general and inter-switching station accounting purposes.

To meter prepurchased telecommunication-time during a telecommunication process, data processing means 87 is operably associated with first data storage means 80, and a central telecommunication-time data storage means 88, as shown in FIG. 10. In general, data processing means 87 can be any suitably programmed device, such as a computing system running appropriate software for prepurchased telecommunication-time accounting and management. Central telecommunication-time data storage means 88 can be realized by any non-volatile memory device capable of storing data representative of each particular purchaser/subscriber, the date and amount of purchased telecommunication-time, and running balances of telecommunication-time currently available to each such subscriber. Using the time duration data of each telecommunication connection transaction record in data storage means 88, telecommunication-time data of the corresponding subscriber being stored in data storage means 80, is updated through data processing by data processor 87, as shown. As such time data will typically be updated periodically or continuously to reflect decrements therein during an established telecommunication connection, such memory storage capability should provide fast access time for time decrementing purposes achieved by way of data processing. This telecommunication-time metering capability can of course be realized in a number of alternative ways which will become apparent hereinafter to those skilled in the art. Also, complete monthly statements reflecting each telecommunication connection made in the switching network by a particular prepaid subscriber or sponsor, can be readily generated by data processor 87 from transaction data in data storage means 80, then stored in billing storage means 85, and subsequently printed out by printing means 86 for mailing to customers.

Upon detecting (i.e. decoding) a request for prepaid telecommunication-time service by a particular subscriber, switching computer 76 must determine that sufficient telecommunication-time is available in that subscriber. In the illustrated embodiment of FIG. 10, data monitoring means 89 is provided for monitoring the present status of telecommunication-time data for each subscriber requesting (i) a telecommunication connection within the network and (ii) prepaid servicing. Preferably, data monitoring means 89 is a processor which reads current telecommunication-time data stored in data storage means 88 for a particular calling subscriber, that is, upon receiving a status request from the switching computer to do so.

In the illustrated embodiment, this status request typically will issue from the switching computer after it has decoded the incoming dialed number and detected a rate-disable code (i.e. request for prepaid service). As illustrated, this status request from the central switching computer is provided to data monitoring means 88 by way of bus 90. Status data produced from data monitoring means 89 is provided to speech message generating means 91 by way of bus 92. In turn, speech message generating means 91 converts received status data into an appropriate speech message which is provided to switching computer 76. In turn, switching computer 76 transmits to the calling telecommunication device prior to establishing a telecommunication connection within the network. Speech message generating means 91 can be realized by any commercially available speech synthesis system appropriately interfaced with data monitoring means 89 and the switching computer. Preferably, upon determining that there is sufficient prepurchased telecommunication-time available to the calling party, the speech message transmitted can advise the calling party as to various information, including (i) the remaining balance of prepurchased telecommunication-time debited to his account and (ii) the previously prepaid telecommunication connection established in the network against his or her prepurchased account. Various system prompts may also be generated for particular purposes.

In FIG. 11, the second embodiment of the central switching station and associated billing system according to the second aspect of the present invention, is schematically illustrated. As will be illustrated in detail below, this embodiment is characterized by prepaid subscribers being registered within the billing system, thus avoiding the need to detect which callers at the central switching station are prepaid subscribers eligible for prepaid service.

As shown in FIG. 11, each central switching station 70' of the greater telecommunication switching network comprises a telecommunication switching means 76', and transaction data generating means 77'. Telecommunication switching means 76' preferably is realized in the form of a high-speed switching computer having essentially all of the capabilities of the switching computer illustrated in FIG. 10. Switching computer 76' also includes incoming-number buffering circuitry and decoding circuitry for decoding incoming number sequences using a variety of code detection processes, such as, for example, area-code detection and prepaid-time status request detection. In this particular embodiment, rate-disable detection and rate-reenable detection, as described above, need not be performed at the central switching station prior to effectuating a telecommunication connection within the network. Consequently, the transaction record data produced from transaction record data generating means 77 at the termination of each call and transmitted to billing system 73 by way of lines 95, is essentially the same for calls placed by prepaid participating subscribers and non-participating subscribers alike. Advantageously, this approach minimizes requirements on the central switching computer when carrying out the method of the present invention.

As illustrated in FIG. 10, each billing system 73 comprises transaction record data processing means 96, prepaid subscriber directory 97, first and second data storage means 98 and 9, rate-data storage means 100, call cost processing unit 101, billing record storage means 102 and bill printing means 103. Transaction-record data processing means 96 analyzes each received transaction record to determine whether its calling or called party (i.e. number) is listed in the prepaid subscriber directory 97. As discussed in connection with the embodiment of FIG. 10, the specific types of prepaid service being offered by the telecommunication carrier, will determine how transaction record data is processed prior to storage and telecommunication-time accounting and management. For example, prepaid "800" number service requires analyzing the called number to determine who is to be debited for telecommunication connections established over "800" number telecommunication lines. If the transaction record corresponds to a prepaid account however listed in the prepaid subscriber (i.e. sponsor) directory 97, then the transaction record is transferred to first data storage means 98 for storage. If the transaction record is not listed in the prepaid subscriber directory, then it is transferred into second data storage means 99 for storage and subsequent cost computation. First and second data storage means 98 and 99 can be any memory device which stores transaction data records produced from the central switching station. While illustrated as separate units, first and second data storage means 98 and 99 can be realized in single data storage device whose storage space is ramified into two separate subspaces.

To compute the cost for each transaction, rate-data from rate-data storage means 100 and the transaction record data from second data storage means 99 are both provided to cost processor 101, as shown. In general, cost processor 101 can be any suitably programmed device, such as a computing system running appropriate software for cost computation. Typically, rate-data is a function of the time, day and duration of the call, and thus such information from each transaction record will be used to select the applicable calling rate from rate-data storage means 100.

For each transaction record transferred to the cost processor, a billing record is generated and stored in billing record storage means 102. Preferably, for subscribers allocated a telecommunication line, billing record data is organized according to numbers assigned to these telecommunication lines. In this way, a complete monthly billing record can be readily generated for each number (i.e. subscriber), and printed out for mailing to customers in a conventional fashion. For prepaid subscribers without an allocated line, transaction record data can be organized according to an assigned subscriber number. Notably, such organized transaction record data will be used for general and inter-switching station accounting purposes.

To meter prepurchased telecommunication-time during each telecommunication process conducted through the network, data processing means 104 is operably associated with first data storage means 98, and with a central telecommunication-time data storage means 105, as shown. In general, data processing means 104 can be any suitably programmed device, such as a computing system running appropriate software for prepurchased telecommunication-time accounting and management. Central telecommunication-time data storage means 105 can be realized by any non-volatile memory device capable of storing data representative of each particular purchaser/subscriber, the date and amount of purchase of telecommunication-time, and the running balances of telecommunication-time currently available to each such subscriber. Using the time duration data of each telecommunication connection transaction record in data storage means 98, telecommunication-time data of the corresponding subscriber being stored in data storage means 105, is updated through data processing by data processor 104. As in all other embodiments, this telecommunication-time metering capability can be realized in a number of alternative ways which will become apparent hereinafter to those skilled in the art. Also, complete monthly statements reflecting each telecommunication connection made in the switching network by a particular subscriber or sponsor, can be readily generated by data processor 104 from transaction data in first data storage means 98, then stored in billing record memory 102, and subsequently printed out by printing means 103 for mailing to customers.

In the illustrated embodiment of the present invention, specific subscriber options, such as rate-disable and rate-reenable after telecommunication-time depletion, are preselected by the user in advance of conducting telecommunication processes through the network. These subscriber options are then programmed within the billing system described above by, for example, the central switching station operator. For each party who becomes a prepaid subscriber with the rate-disable option, the line number of the prepaid subscriber is entered into prepaid subscriber directory 97 and the initial amount of prepurchased telecommunication-time is entered into telecommunication-time data storage means 105. If prepaid subscriber also selects the rate-reenable option, then data indicating this option is also stored in prepaid subscriber directory 97. Notably, all such options are registered with the billing system by storage of representative data in prepaid subscriber directory 97. In this way, all transactions can be indexed by transaction data processor 104 in order to reflect which subscribers (i.e. prepayment-service sponsors) selected which options.

In the event that available telecommunication-time is depleted during an on-going telecommunication connection and the user is registered the rate-reenable option with the central switching station and billing system, a rate-reenable process will automatically be carried out. For example, consider the case where a transaction record is generated for a prepaid telecommunication process, in which available telecommunication-time is depleted prior to its completion. In this case, the transaction record will be stored in first data storage means 105, as the subscriber is registered in prepaid subscriber directory as being a prepaid subscriber with, for example, the rate-reenable option. When data processing means 104 uses the transaction record data to decrement the subscriber's prepaid telecommunication-time to zero time available, data processing means 104 will automatically apply the remaining portion of transaction record time (i.e. not prepaid) to call-cost processor 101, in order to compute call cost using conventional rates, as described hereinbefore. Thereafter, data processing means 104 writes data into prepaid subscribers directory 97 indicating that the subscriber's subscription has lapsed, and that all subsequent transaction records of this subscriber shall be subject to rate-based cost computation.

In the illustrated embodiment of FIG. 11, data monitoring means 108 is provided for monitoring the present status of telecommunication-time data for each line subscriber of prepaid servicing. Preferably, data monitoring means 108 is a processor which, upon request by the switching computer or preprogrammed monitoring processor 89, reads current telecommunication-time data stored in data storage means 105 for a particular calling subscriber.

In one embodiment, this status request issues from switching computer 76' after the subscriber has dialed a toll-free time-status request code. When this time-status request code is received at the central switching station, it is buffered and decoded in a straightforward manner. This status request is then transferred from switching computer 76' to data monitoring processor 108 by way of bus 109. Status data produced from data monitoring processor 108 is provided to message generating means 110 by way of bus 111. In the case where a telephone instrument is connected to a prepaid subscriber line, message generating means 110 can convert received status data into an appropriate speech message which is provided to switching computer 76'. In turn, switching computer 76' transmits the speech message to the calling telecommunication device prior to establishing a telecommunication connection within the network. Speech message generating means 10 can be realized by any commercially available speech synthesis system appropriately interfaced with data monitoring processor 108 and the switching computer. Preferably, upon determining that there is sufficient prepurchased telecommunication-time available to the calling party, the speech message transmitted can advise the calling party as to various information, including (i) the remaining balance of prepurchased telecommunication-time debited to his account and (ii) the previously prepaid telecommunication connection established in the network against his or her prepurchased account. Various system prompts may also be generated for particular purposes.

In another embodiment, a status request can be automatically generated by status monitoring processor 89 where it has determined that the prepurchased telecommunication-time data of a subscriber (i.e. sponsor) has fallen below a predetermined level. For example, in the case where a facsimile machine is connected to a particular prepaid subscriber line, status data produced from data monitoring processor 108 is provided to message generating means 110 by way of bus 111. In this particular embodiment, a facsimile message particularly adapted for reproduction by the subscriber facsimile machine can be formatted and automatically dialed-out over the subscriber line through switching computer 76'. In this way, the central switching station, in effect, can transmit a facsimile message to the subscriber facsimile machine to advise that the running balance of prepurchased telecommunication-time is below predetermined threshold amount, thereby serving as a reminder to purchase additional telecommunication-time.

The method and apparatus of the present invention has numerous applications, including, for example, groundbased and mobile telephonic-communication systems, such as cellular phone networks, schematically illustrated in FIGS. 1 and 9.

In addition, the embodiment of the present invention illustrated in FIGS. 9 and 11, in particular, is especially advantageous to subscriber lines who are collectively organized as a group. In this way, the group of subscriber lines can register by line number with the central switching station and associated billing systems, and thus each have access to a central pool of prepurchased telecommunication-time. For example, any corporation, cooperative apartment, condominium complex, business organization, or group of subscriber lines however associated geographically, socially, or politically can purchase a bulk amount of prepurchased telecommunication-time from a telecommunication carrier. The line numbers of the group are then registered in prepaid subscriber directory 97 and data representative of the bulk amount of prepurchased telecommunication-time is stored in first data storage means 98 of FIG. 11. Then, anytime a subscriber line belonging to this prepaid group is utilized to effect a telecommunication connection across the network, the transaction record generated is used to decrement the bulk amount of prepurchased telecommunication-time.

While the particular embodiments shown and described above have proven to be useful in many applications in the telecommunication art, further modifications of the present invention herein disclosed will occur to persons skilled in the art to which the present invention pertains. All such modifications are deemed to be within the scope and spirit of the present invention defined by the appended claims.

What is claimed is:

1. Telecommunication-time metering device utilizable by a first information transferring device for prepayment of information transfers between said first information transferring device and a second information transferring device operably associated with the telecommunication lines of a telecommunication network, said telecommunication-time metering device comprising:

data storage means for storing telecommunication-time data representative of a prepurchased amount of telecommunication-time available to said first information transferring device, for prepayment of information transfers between said first and second information transferring devices within said telecommunication network;

time metering means for measuring the time duration of each information transfer between said first and second information transferring devices within said telecommunication network; and data processing means for processing said stored telecommunication-time data within said data storage means so as to indicate decrements in said prepurchased amount of telecommunication-time, said decrements being substantially equal to the measured time duration of said information transfer.

2. The telecommunication-time measuring device of claim 1, which further comprises a display means in operable association with said data storage means, for visually displaying a graphical representation of the balance of said prepurchased amount of telecommunication-time.

3. The telecommunication-time measuring device of claim 1, wherein the balance of said prepurchased amount of telecommunication-time is continously visually displayed during each said information transfer.

4. The telecommunication-time measuring device of claim 1, which further comprises an alarm generating means for generating a perceptible alarm signal in response to said telecommunication-time data representing a balance of prepurchased telecommunication-time that is less than a predetermined time-threshold value.

5. The telecommunication-time measuring device of claim 1, wherein said data storage means comprises a data reading/writing means for reading telecommunication-time data stored in a portable data storage device, and for writing processed telecommunication-time data representative of said prepurchased amount of telecommunication time.

6. The telecommunication-time measuring device of claim 5, wherein said data reading/writing means comprises means for reading telecommunication-time data stored on a magnetic card storage device, and for writing processed telecommunication-time data thereon.

7. The telecommunication-time measuring device of claim 1, wherein said first information transferring device comprises a first digital information transferring system, and said second information transferring system comprises a second digital information transferring system.

* * * * *